United States Patent
Yoon et al.

(10) Patent No.: US 8,958,021 B2
(45) Date of Patent: Feb. 17, 2015

(54) DISPLAY SUBSTRATE AND FABRICATING METHOD THEREOF

(75) Inventors: Soo-Wan Yoon, Hwaseong-si (KR); Joon-Chul Goh, Hwaseong-si (KR); Eun-Guk Lee, Seoul (KR); Young-Soo Yoon, Anyang-si (KR); Dong-Yoon Kim, Seoul (KR); Byung-Duk Yang, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 404 days.

(21) Appl. No.: 13/081,250

(22) Filed: Apr. 6, 2011

(65) Prior Publication Data
US 2012/0044434 A1 Feb. 23, 2012

(30) Foreign Application Priority Data

Aug. 19, 2010 (KR) .......................... 10-2010-0080449

(51) Int. Cl.
*G02F 1/1343* (2006.01)
*G02F 1/136* (2006.01)
*G09G 3/36* (2006.01)
*G02F 1/1362* (2006.01)
*G02F 1/1337* (2006.01)

(52) U.S. Cl.
CPC ........ *G09G 3/3659* (2013.01); *G02F 1/133707* (2013.01); *G02F 1/136213* (2013.01); *G02F 1/13624* (2013.01); *G02F 2001/133742* (2013.01); *G02F 2001/134354* (2013.01)
USPC ................... 349/38; 349/39; 349/48

(58) Field of Classification Search
CPC ............. G02F 1/136213; G02F 2001/134354; G02F 1/133514; G02F 1/133345; G02F 1/134363; G02F 1/136227; G02F 1/136286; G02F 1/13624; H01L 27/1255; H01L 27/3265
USPC .......................................... 349/38, 39, 43, 48
See application file for complete search history.

(56) References Cited

U.S. PATENT DOCUMENTS

| | | | | |
|---|---|---|---|---|
| 5,729,308 | A * | 3/1998 | Yamazaki et al. | 349/39 |
| 6,078,367 | A * | 6/2000 | Satou | 349/46 |
| 6,091,466 | A * | 7/2000 | Kim et al. | 257/59 |

(Continued)

*Primary Examiner* — Edward Glick
*Assistant Examiner* — David Chung
(74) *Attorney, Agent, or Firm* — H.C. Park & Associates, PLC

(57) ABSTRACT

An exemplary embodiment of the present invention discloses a display substrate including a pixel connected to a first gate line and a data line. The pixel includes a first sub-pixel including a first liquid crystal capacitor and a first switching element including a gate electrode connected to the first gate line, a source electrode connected to the data line, and a drain electrode connected to the first liquid crystal capacitor. The pixel also includes a second sub-pixel including a second liquid crystal capacitor and a second switching element including a gate electrode connected to the first gate line, a source electrode connected to the data line, and a drain electrode connected to the second liquid crystal capacitor. The pixel further includes a controller including a control capacitor and a control switching element, the control switching element connected between a terminal of the control capacitor and the drain electrode of the second switching element. The control capacitor includes a first capacitor electrode and a second capacitor electrode. The first capacitor electrode is arranged on the same level on the display substrate as the gate electrode or is arranged on the same level on the display substrate as the source electrode and the drain electrode. The second capacitor electrode is arranged on the same level on the display substrate as a pixel electrode.

17 Claims, 30 Drawing Sheets

(56) References Cited

U.S. PATENT DOCUMENTS

| | | | |
|---|---|---|---|
| 6,980,262 B2 * | 12/2005 | Song | 349/39 |
| 7,486,360 B2 * | 2/2009 | Kim | 349/114 |
| 7,724,336 B2 * | 5/2010 | Kim et al. | 349/141 |
| 2006/0119753 A1 * | 6/2006 | Luo et al. | 349/38 |
| 2006/0192906 A1 * | 8/2006 | Ryu et al. | 349/43 |
| 2008/0088788 A1 * | 4/2008 | Cho et al. | 349/160 |

* cited by examiner

DISPLAY SUBSTRATE AND FABRICATING METHOD THEREOF

CROSS-REFERENCE TO RELATED APPLICATION

This application claims priority from Korean Patent Application No. 10-2010-0080449, filed on Aug. 19, 2010, which is hereby incorporated by reference for all purposes as if fully set forth herein.

BACKGROUND OF THE INVENTION

1. Field of the Invention

Exemplary embodiments of the present invention relate to a display substrate and a fabricating method thereof.

2. Discussion of the Background

In today's information-oriented society, an electronic display device plays an important role, and various electronic display devices are widely used in various industrial fields. Further, along with the development of semiconductor technology, various electronic devices are required to have low voltage and low power consumption, and there is an increasing trend toward light and compact electronic devices. Accordingly, in order to meet these requirements, there is an increased demand for a flat panel display device having low driving voltage and low power consumption in addition to small thickness and weight.

SUMMARY OF THE INVENTION

Exemplary embodiments of the present invention provide a display substrate having high operational stability.

Exemplary embodiments of the present invention also provide a fabricating method of the display substrate.

Additional features of the invention will be set forth in the description which follows, and in part will be apparent from the description, or may be learned by practice of the invention.

An exemplary embodiment of the present invention discloses a display substrate including a pixel connected to a first gate line and a data line, wherein the pixel includes a first sub-pixel including a first liquid crystal capacitor and a first switching element including a gate electrode connected to the first gate line, a source electrode connected to the data line, and a drain electrode connected to the first liquid crystal capacitor, a second sub-pixel including a second liquid crystal capacitor and a second switching element including a gate electrode connected to the first gate line, a source electrode connected to the data line, and a drain electrode connected to the second liquid crystal capacitor, and a controller including a control capacitor and a control switching element, the control switching element connected between a terminal of the control capacitor and the drain electrode of the second switching element, wherein the control capacitor includes a first capacitor electrode and a second capacitor electrode, the first capacitor electrode is arranged on the same level on the display substrate as the gate electrode or is arranged on the same level on the display substrate as the source electrode and the drain electrode, and the second capacitor electrode is arranged on the same level on the display substrate as a pixel electrode.

An exemplary embodiment of the present invention also discloses a display substrate including a substrate, a first gate electrode and a first capacitor electrode arranged on the substrate, a gate insulating layer arranged on the first gate electrode and the first capacitor electrode, a semiconductor pattern arranged on the gate insulating layer, a first source electrode and a first drain electrode arranged on the semiconductor pattern, the first source electrode and the first drain electrode being spaced apart from each other, a first pixel electrode connected to the first drain electrode, and a second capacitor electrode arranged on the gate insulating layer, the second capacitor electrode arranged on the same level on the substrate as the first pixel electrode.

An exemplary embodiment of the present invention also discloses a display substrate including a substrate, a first gate electrode arranged on the substrate, a gate insulating layer arranged on the first gate electrode, a first semiconductor pattern and a second semiconductor pattern arranged on the gate insulating layer, a first source electrode and a first drain electrode arranged on the first semiconductor pattern, and a first capacitor electrode arranged on the second semiconductor pattern, a passivation layer arranged on the first source electrode, the first drain electrode and the first capacitor electrode, a trench formed in the passivation layer at a position corresponding to the first capacitor electrode, and a second capacitor electrode arranged in the trench.

An exemplary embodiment of the present invention also discloses a method of fabricating a display substrate, the method including forming a first gate electrode and a first capacitor electrode on a substrate, forming a gate insulating layer on the first gate electrode and the first capacitor electrode, forming a semiconductor pattern on the gate insulating layer, forming a first source electrode and a first drain electrode on the semiconductor pattern, the first source electrode and the first drain electrode being spaced apart from each other, and simultaneously forming a first pixel electrode connected to the first drain electrode, and a second capacitor electrode overlapping the first capacitor electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
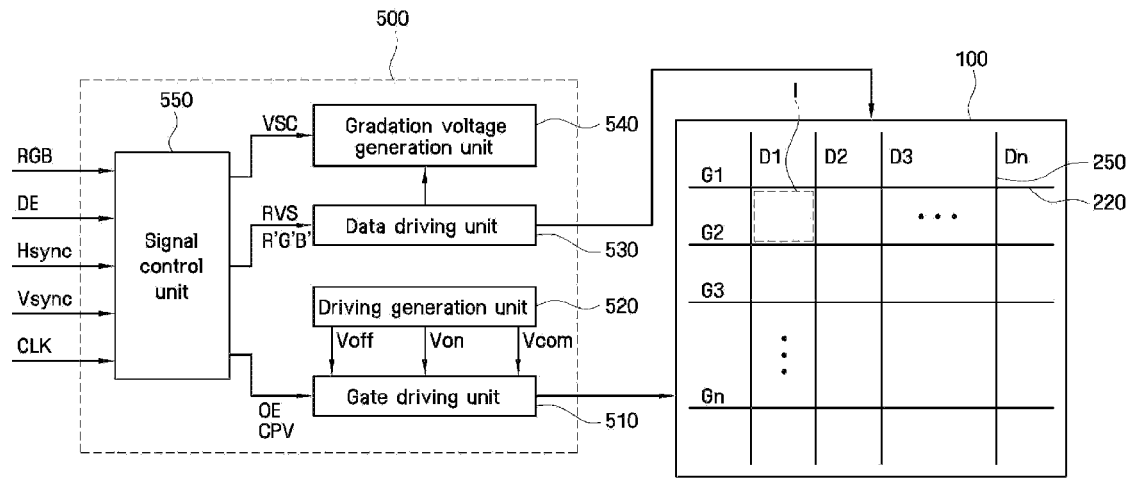
FIG. 1 shows a block diagram of a display device in accordance with exemplary embodiments of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and willfully convey the concept of the invention to those skilled in the art, and the present invention will only be defined by the appended claims. Throughout the specification, like reference numerals in the drawings denote like elements.

It will be understood that when an element or a layer is referred to as being "on" or "connected to" another element or layer, it can be directly on or directly connected to the other element, or intervening elements may also be present. In contrast, when an element is referred to as being "directly on" or "directly connected to" another element, there are no intervening elements present. Like numbers refer to like elements throughout. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows a block diagram of a display device in accordance with exemplary embodiments of the present invention.

The display device in accordance with the exemplary embodiments of the present invention includes a display panel 100 and a panel driving unit 500. A plurality of pixels I are formed in a matrix shape on the display panel 100. The display panel 100 is a liquid crystal panel including a liquid crystal layer interposed between a first substrate and a second substrate. The panel driving unit 500 includes a gate driving unit 510, a driving voltage generation unit 520, a data driving unit 530, a gradation voltage generation unit 540, and a signal control unit 550 for driving the above-mentioned units.

The driving voltage generation unit 520 generates a gate-on voltage Von for turning on switching elements T1, T2, and T3, a gate-off voltage Voff for turning off the switching elements T1, T2, and T3, a common voltage Vcom to be applied to a common electrode and the like.

The gradation voltage generation unit 540 generates gradation voltages relating to the luminance of the display device.

The gate driving unit 510 is connected to a gate line and applies a gate signal formed by combination of the gate-on voltage Von and the gate-off voltage Voff from the driving voltage generation unit 520 to the gate line.

The data driving unit 530 selects a specific gradation voltage among the gradation voltages applied from the gradation voltage generation unit 540 according to the operation of the signal control unit 550 and applies the selected gradation voltage to a data line.

The signal control unit 550 is supplied with RGB signals R, G, and B and an input control signal for controlling them, e.g., a vertical synchronizing signal Vsync, a horizontal synchronizing signal Hsync, a main clock CLK and a data enable signal DE from an external graphic controller. The signal control unit 550 generates a gate control signal, a data control signal and a voltage selection control signal VSC based on the input control signal. The gate control signal includes a vertical synchronization start signal STV for instructing an output start of a gate-on pulse (high section of the gate signal), a gate clock signal for controlling an output period of the gate-on pulse, a gate-on enable signal OE for defining a width of the gate-on pulse, and the like. The data control signal includes a horizontal synchronization start signal STH for instructing an input start of a gradation signal, a load signal LOAD or TP for applying a corresponding data voltage to the data line, an inversion driving signal RVS for inverting the polarity of the data voltage, a data clock signal HCLK, and the like.

The pixels I are minimum units of basic colors independently representing colors, generally, red, blue and green. The pixels I are generally defined as regions surrounded by data lines and gate lines, but it is not limited thereto. In some embodiments, the pixels may be defined as regions surrounded by data lines and storage lines or gate lines and storage lines.

Figure 2:
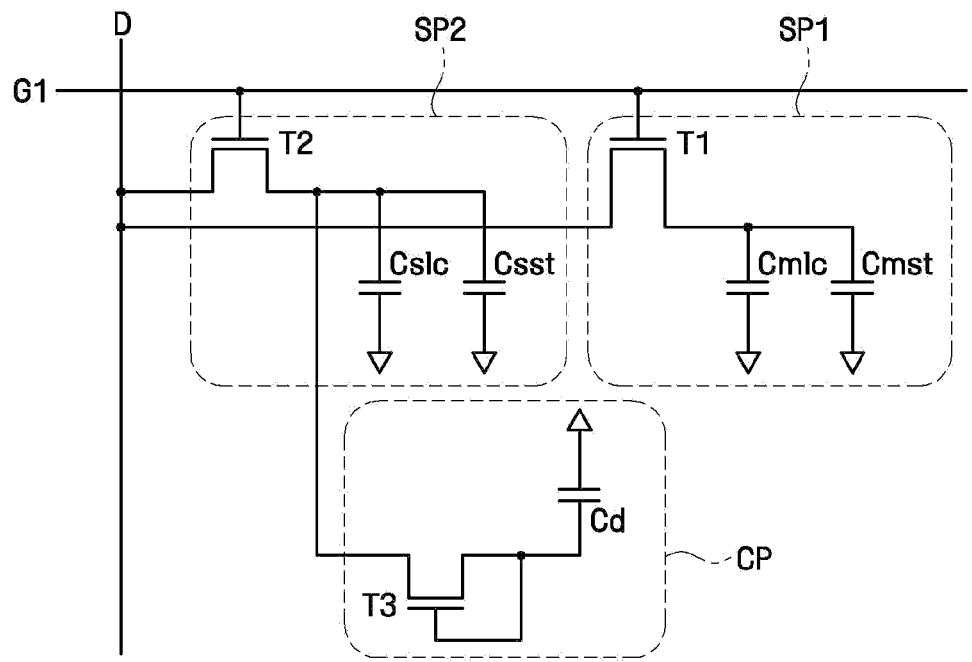
FIG. 2 shows an equivalent circuit diagram of a pixel I used in a display substrate in accordance with a first exemplary embodiment of the present invention.

FIG. 2 shows an equivalent circuit diagram of the pixel I used in a display substrate in accordance with a first embodiment of the present invention.

Referring to FIG. 2, the pixel I is connected to a gate line G1 and a data line D. The pixel I includes a first sub-pixel SP1, a second sub-pixel SP2, and a controller CP.

Specifically, the first sub-pixel SP1 includes a first liquid crystal capacitor Cmlc, a first storage capacitor Cmst, and a first switching element T1. In this case, a control terminal of the first switching element T1 is connected to the gate line G1, and an input terminal of the first switching element T1 is connected to the data line D. Further, an output terminal of the first switching element T1 is connected to the first liquid crystal capacitor Cmlc and the first storage capacitor Cmst.

The second sub-pixel SP2 includes a second liquid crystal capacitor Cslc, a second storage capacitor Csst, and a second switching element T2. In this case, a control terminal of the second switching element T2 is connected to the gate line G1, and an input terminal of the second switching element T2 is connected to the data line D. Further, an output terminal of the second switching element T2 is connected to the second liquid crystal capacitor Cslc and the second storage capacitor Csst.

The controller CP includes a control capacitor Cd and a control switching element T3. The control switching element T3 is connected between one terminal of the control capacitor Cd and the output terminal of the second switching element T2.

That is, as shown in FIG. 2, when the control switching element T3 is turned on, the second liquid crystal capacitor Cslc and the second storage capacitor Csst share charges with each other. Accordingly, the voltage charged in the second liquid crystal capacitor Cslc is changed. Particularly, because a second gate line is not used, unlike a pixel to be described later (see FIG. 22), it may be called self-charge sharing. The self-charge sharing method may increase an aperture ratio because a next gate line is not used.

Figure 3:
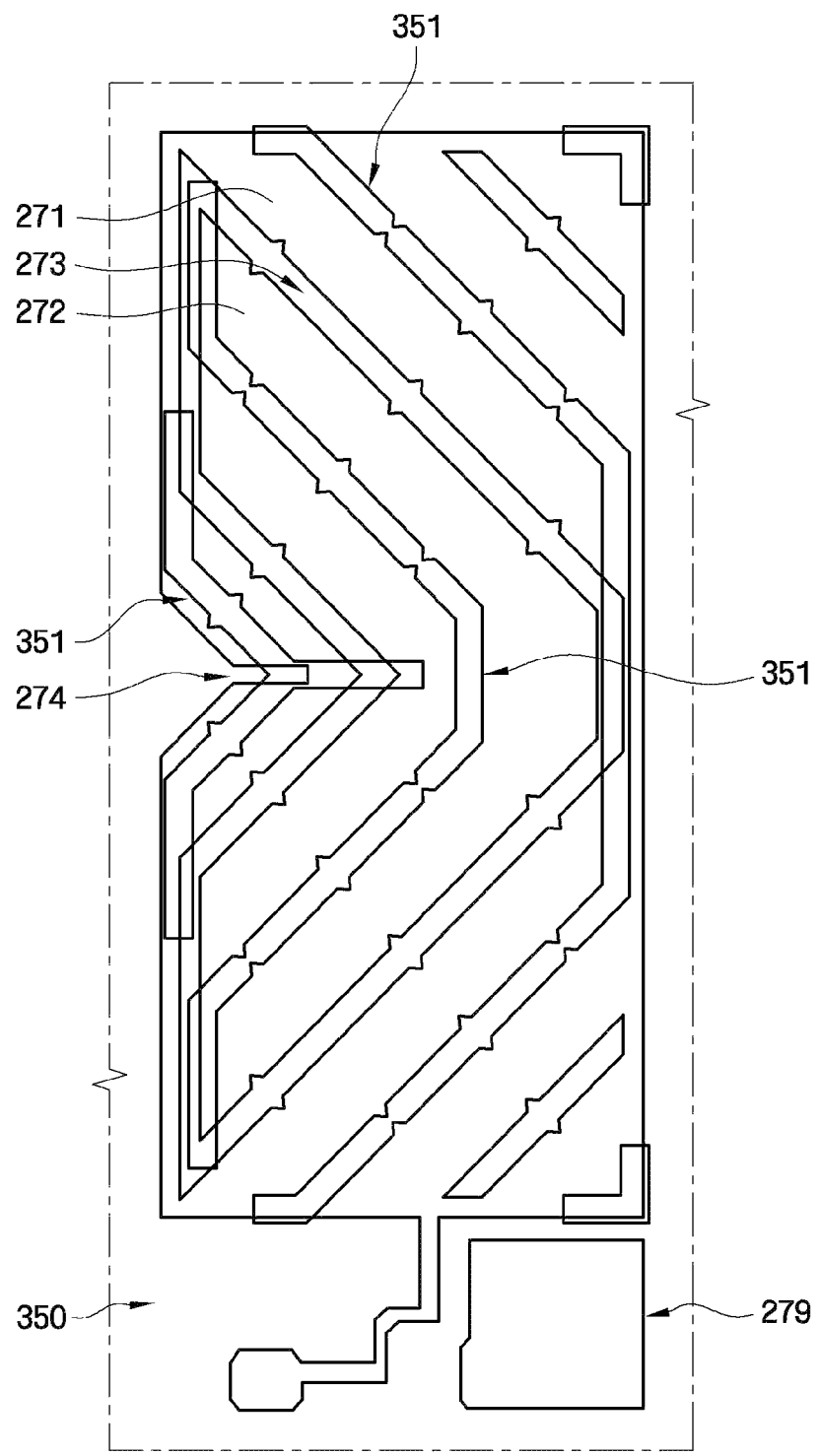
FIG. 3 shows a layout for explaining a display device in accordance with the first exemplary embodiment of the present invention.

FIG. 3 shows a layout for explaining a display device in accordance with the first exemplary embodiment of the present invention. Specifically, FIG. 3 shows a layout of a pixel electrode and a common electrode of the display device including the pixel of FIG. 2.

Referring to FIG. 3, a lower plate includes a first pixel electrode 271, a second pixel electrode 272, and an upper plate includes a common electrode 350 facing the pixel electrodes 271 and 272. A second capacitor electrode 279 is formed at a same level as the first and second pixel electrodes 271 and 272.

The first pixel electrode 271 and the second pixel electrode 272 are separated from each other by an opening pattern 273. The first and second pixel electrodes 271 and second pixel electrode 272 may further include an opening pattern 274. Meanwhile, the common electrode 350 of the upper plate may have a protrusion pattern or an opening pattern as a domain control unit 351.

The opening patterns 273 and 274 of the lower plate and the domain control unit 351 of the upper plate may be alternately arranged. Further, the domain control unit 351 of the upper plate may have a body parallel with the opening patterns 273 and 274 of the lower plate and a branch extending along a boundary portion of the pixel electrodes 271 and 272 of the lower plate. Moreover, the body of the domain control unit 351 may further have a notch recessed or protruding from the portion parallel with the opening patterns 273 and 274.

Figure 4:
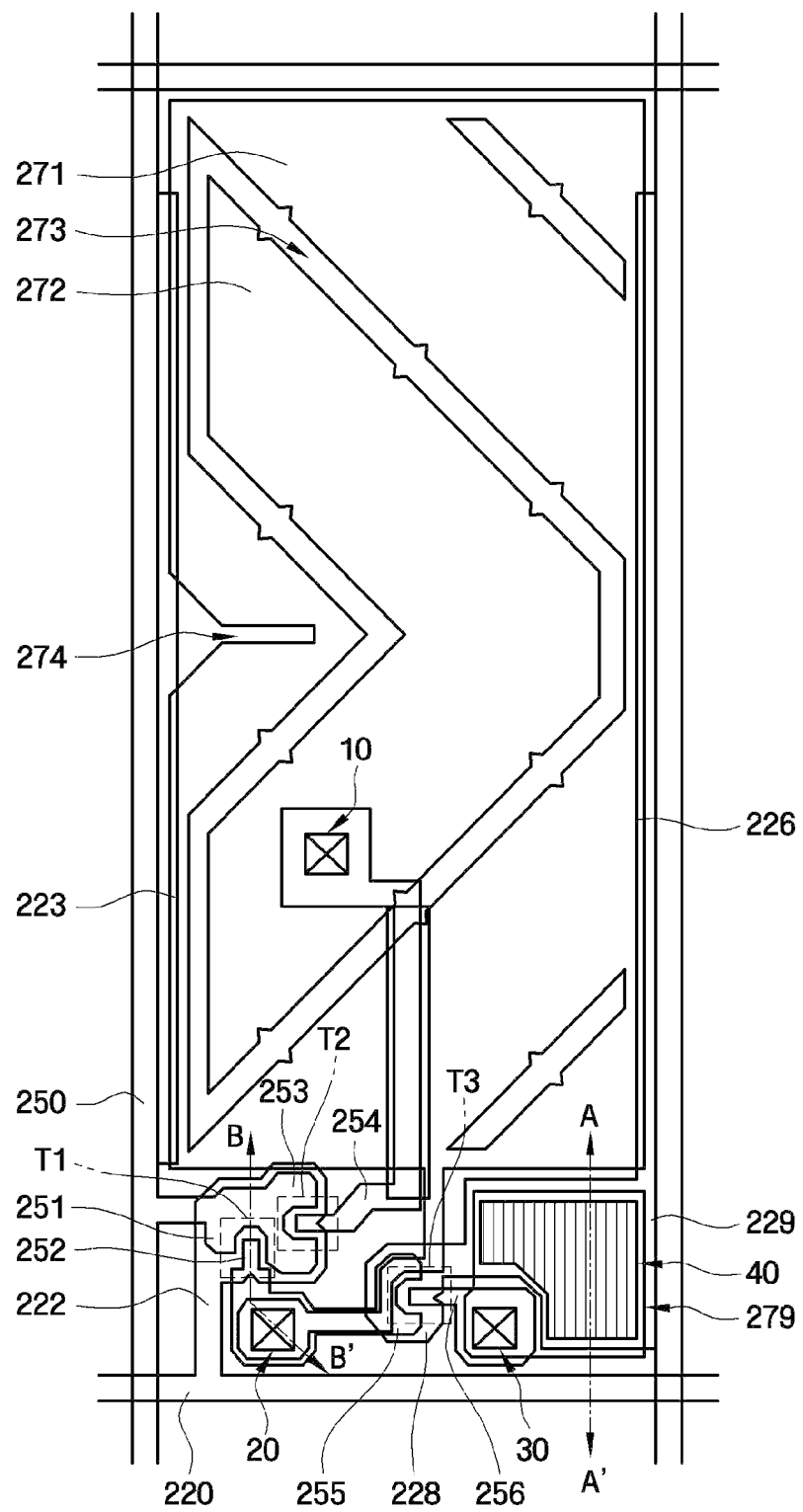
FIG. 4 and FIG. 5 are a layout and a cross sectional view for explaining the display device in accordance with the first exemplary embodiment of the present invention.
Figure 5:
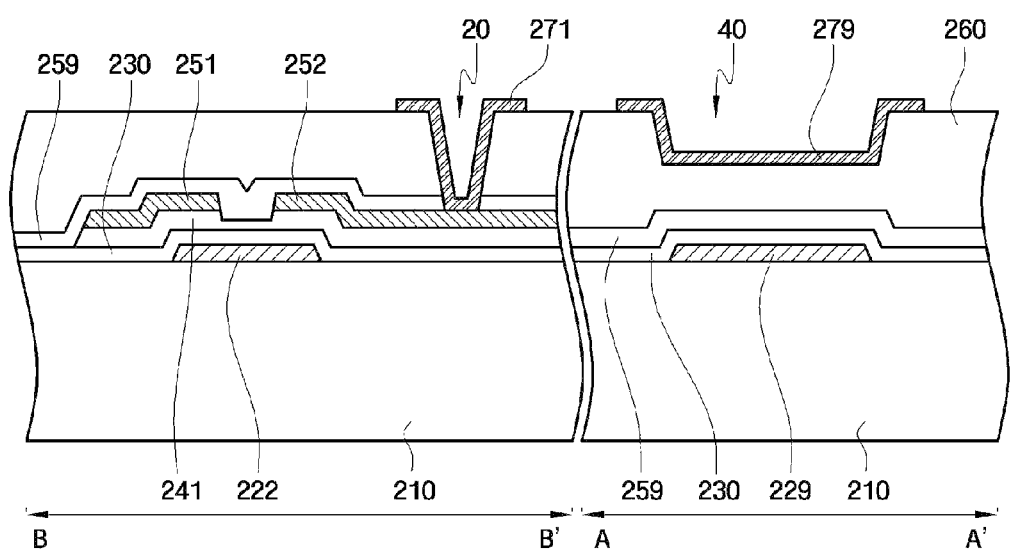

FIG. 4 and FIG. 5 are a layout and a cross sectional view for explaining the display device in accordance with the first exemplary embodiment of the present invention. Specifically, FIG. 4 shows a layout of a display substrate including the pixel electrode of the display device including the pixel of FIG. 2. FIG. 5 is a cross sectional view taken along lines A-A' and B-B' of FIG. 4.

Referring to FIG. 4 and FIG. 5, as described above, the pixel I includes three switching elements T1, T2, and T3. The first switching element T1 drives the first pixel electrode 271, the second switching element T2 drives the second pixel electrode 272, and the control switching element T3 changes an application voltage of the second pixel electrode 272.

A gate wiring 220 and 222, a first storage line 223, a second storage line 226 and a first capacitor electrode 229 are formed on a substrate 210. The substrate 210 may be formed of, for example, glass such as soda lime glass and borosilicate glass or plastic, but it is not limited thereto.

The gate wiring 220 and 222 and the first and second storage lines 223 and 226 and the first capacitor electrode 229 may have a single layer or multilayer structure of metal, for example, aluminum-based metal such as aluminum (Al) and an aluminum alloy, silver-based metal such as silver (Ag) and a silver alloy, copper-based metal such as copper (Cu) and a copper alloy, molybdenum-based metal such as molybdenum (Mo) and a molybdenum alloy, manganese-based metal such as manganese (Mn) and a manganese alloy, chromium (Cr), titanium (Ti), tantalum (Ta) or the like. Further, the gate wiring 220 and 222 and the first and second storage lines 223 and 226 and the first capacitor electrode 229 may have a multilayer structure including two conductive films (not shown) having different physical properties. One of the conductive films may be formed of low resistivity metal, e.g., aluminum-based metal, silver-based metal and copper-based metal in order to reduce signal delay or voltage drop of the gate wiring 220 and 222 and the first and second storage lines 223 and 226 and the first capacitor electrode 229. On the other hand, the other one of the conductive films may be formed of a different material, e.g., molybdenum-based metal, chromium (Cr), titanium (Ti), tantalum (Ta) or the like having excellent contact characteristics with, particularly, zinc oxide (ZnO), indium tin oxide (ITO) and indium zinc oxide (IZO). Preferable examples of such combination may include a structure of a lower film of chromium and an upper film of aluminum, a structure of a lower film of aluminum and an upper film of molybdenum, a structure of a lower film of a copper-manganese (CuMn) alloy and an upper film of copper, a structure of a lower film of titanium and an upper film of copper, and the like.

The gate wiring 220 and 222 includes a first gate line 220 extending in a horizontal direction and a gate electrode 222 connected to the first gate line 220. The storage lines 223 and 226 overlap with the pixel electrodes 271 and 272 and the like to form a capacitor.

The gate electrode 222 may include a first gate electrode of the first switching element T1 and a second gate electrode of the second switching element T2. A gate electrode 228 may be a third electrode of the control switching element T3. The gate electrode 222 may be formed on the first gate line 220 or at a portion extending from the first gate line 220. The third gate electrode 228 may be formed on the second storage line 226 or at a portion extending from the second storage line 226.

A gate insulating layer 230 is formed on the substrate 210 to cover the gate wiring 220 and 222, the first and second storage lines 223 and 226 and the first capacitor electrode 229. The gate insulating layer 230 may be formed of an inorganic insulating material such as silicon oxide (SiOx), benzocyclobutene (BCB), an acrylic material, and an organic insulating material such as polyimide.

A semiconductor layer 241 made of a semiconductor such as hydrogenated amorphous silicon is formed on the gate electrode 222. A resistance contact layer (not shown) made of a material such as silicide or n+hydrogenated amorphous silicon doped with n type impurities in high concentration may be formed on the semiconductor layer 241.

A data wiring 250, 251, 252, 253, 254, 255 and 256 is formed on the semiconductor layer 241 and the gate insulating layer 230. The data wiring 250, 251, 252, 253, 254, 255 and 256 may also have a single layer or multilayer structure of metal. For example, the data wiring 250, 251, 252, 253, 254, 255 and 256 may have a single layer or multilayer structure containing Ni, Co, Ti, Ag, Cu, Mo, Al, Be, Nb, Au, Fe, Se, Mn, Ta or the like. As an example of the multilayer structure, there is a double layer structure of Ti/Al, Ta/Al, Ni/Al, Co/Al, Mo(Mo alloy)/Cu, Mo(Mo alloy)/Cu, Ti(Ti alloy)/Cu, TiN (TiN alloy)/Cu, Ta(Ta alloy)/Cu, TiOx/Cu, Al/Nd, Mo/Nb, Mn(Mn alloy)/Cu or the like.

The data wiring 250, 251, 252, 253, 254, 255 and 256 includes a data line 250 formed, for example, in a vertical direction, to intersect the gate line 220, thereby defining the pixel I, source electrodes 251, 253 and 255, and drain electrodes 252, 254 and 256 separated from the source electrodes 251, 253 and 255 and formed opposite to the source electrodes 251, 253 and 255.

The source electrodes 251 and 253 corresponding to the input terminals of the first switching element T1 and the second switching element T2 are branched off from the data line 250 and positioned above the gate electrode 222. The source electrode 255 corresponding to the input terminal of the control switching element T3 is electrically connected to the pixel electrode 271.

The drain electrode 254 is connected to the second pixel electrode 272 via a contact hole 10. The drain electrode 252 is connected to the first pixel electrode 271 via a contact hole 20.

A passivation layer 259 and 260 is formed on the data wiring 250, 251, 252, 253, 254, 255 and 256 and the semiconductor layer 241. Contact holes 10, 20 and 30 are formed in the passivation layer 259 and 260. The passivation layer 259 and 260 may be formed of an organic film, an inorganic film or multiple films of organic and inorganic films. For example, the passivation layer 259 and 260 may include an inorganic film 259 formed conformally along profiles of the data wiring 250, 251, 252, 253, 254, 255 and 256 and the gate insulating layer 230, and an organic film 260 formed on the inorganic film 259. The organic film 260 may be formed of a material having excellent planarization characteristics.

The pixel electrodes 271 and 272 are formed on the passivation layer 260. The pixel electrodes 271 and 272 are generally formed of a transparent conductive material such as indium tin oxide (ITO) or indium zinc oxide (IZO). The pixel electrodes 271 and 272 include the pixel electrode 271 electrically connected to the drain electrode 252, and the pixel electrode 272 electrically connected to the drain electrode 254.

The pixel electrode 271 and the pixel electrode 272 are separated from each other by the opening pattern 273, and the additional opening pattern 274 is formed in the pixel electrode 271. Meanwhile, an additional opening pattern may be also formed in the pixel electrode 271. The opening pattern formed in the pixel electrode 272 or the pixel electrode 271 partially separates the pixel electrodes 272 and 271 from each other. The opening pattern formed in the pixel electrode 272 or the pixel electrode 271 may be replaced by a protrusion pattern. The opening pattern or protrusion pattern is used as a domain control unit.

A trench 40 may be formed in the passivation layer 259 and 260 to overlap with the first capacitor electrode 229. A second capacitor electrode 279 is formed in the trench 40. The second capacitor electrode 279 may be formed at the same level as the pixel electrodes 271 and 272. In this case, "being formed at the same level" means being formed of the same material through the same step. Accordingly, the second capacitor electrode 279 may be formed of a transparent conductive material (metal material) such as indium tin oxide (ITO) or indium zinc oxide (IZO).

The first capacitor electrode 229 and the second capacitor electrode 279 form the above-described control capacitor Cd. Since both the first capacitor electrode 229 and the second capacitor electrode 279 are formed of a metal material, the control capacitor Cd is a metal-insulator-metal (MIM) capacitor. In the MIM capacitor, the capacitance may have a small change according to the applied voltage. Accordingly, the MIM capacitor may have a higher stability than a metal-insulator-semiconductor (MIS) capacitor. In the MIS capacitor, the capacitance may easily change according to the applied voltage.

Further, the trench 40 is formed in the passivation layer 259 and 260, and the second capacitor electrode 279 is formed in the trench 40. Accordingly, since the first capacitor electrode 229 is close to the second capacitor electrode 279, the control capacitor Cd may have a larger capacitance.

FIG. 6, FIG. 7, FIG. 8, FIG. 9, FIG. 10, FIG. 11, and FIG. 12 show intermediate steps for fabricating the display device in accordance with the first exemplary embodiment of the present invention.

Figure 6:
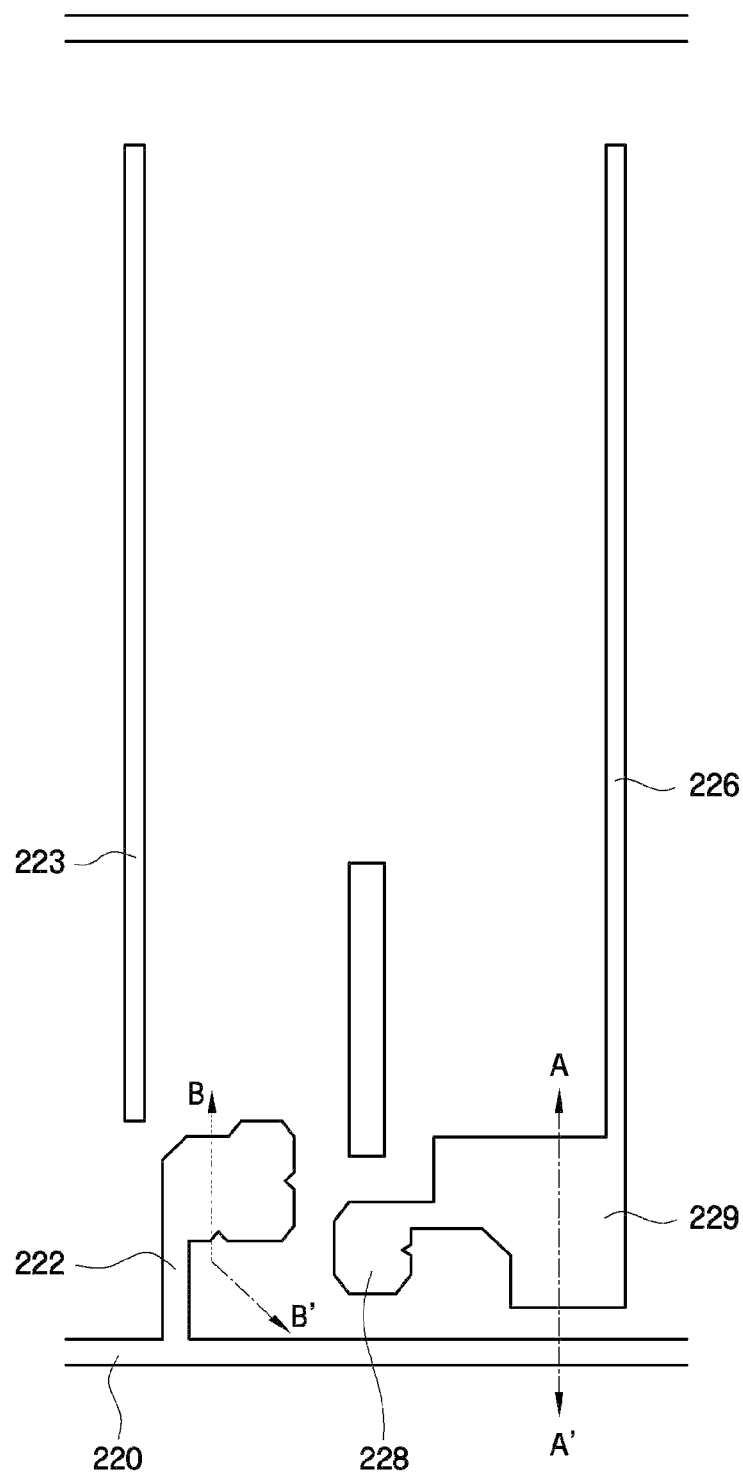
FIG. 6, FIG. 7, FIG. 8, FIG. 9, FIG. 10, FIG. 11, and FIG. 12 show intermediate steps for fabricating the display device in accordance with the first exemplary embodiment of the present invention.
Figure 7:
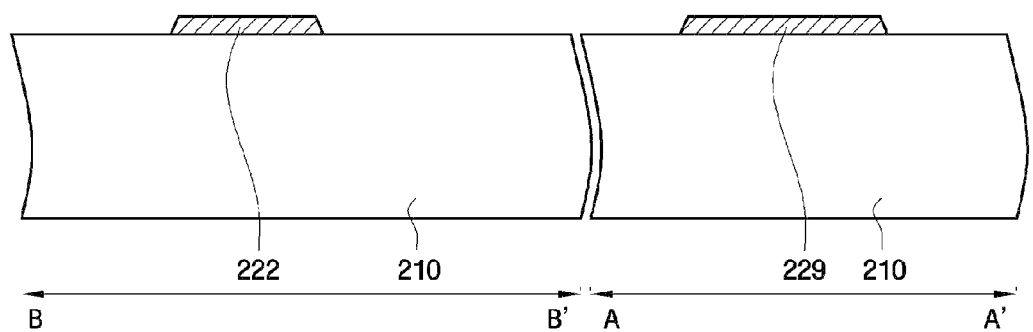

Referring to FIG. 6 and FIG. 7, first, the gate wiring 220 and 222, the first storage line 223 and the second storage line 226, the first gate electrode 228, the first capacitor electrode 229 and the like are formed on the substrate 210.

Specifically, after a metal film for gate and storage wiring (not shown) is deposited on the substrate 210, the metal film is patterned to form the gate wiring 220 and 222, the first storage line 223 and the second storage line 226, the first capacitor electrode 229 and the like.

The metal film for gate and storage wiring may be deposited by, for example, a sputtering method. Further, the metal film for gate and storage wiring may be patterned by wet etching or dry etching. In case of wet etching, an etching solution of phosphoric acid, nitric acid, acetic acid or the like may be used. Further, in case of dry etching, a chlorine-based etching gas such as $Cl_2$ and $BCl_3$ may be used. In this case, when a multilayer metal film for gate wiring is etched by anisotropic dry etching, the gate wiring can be finely patterned.

Figure 8:
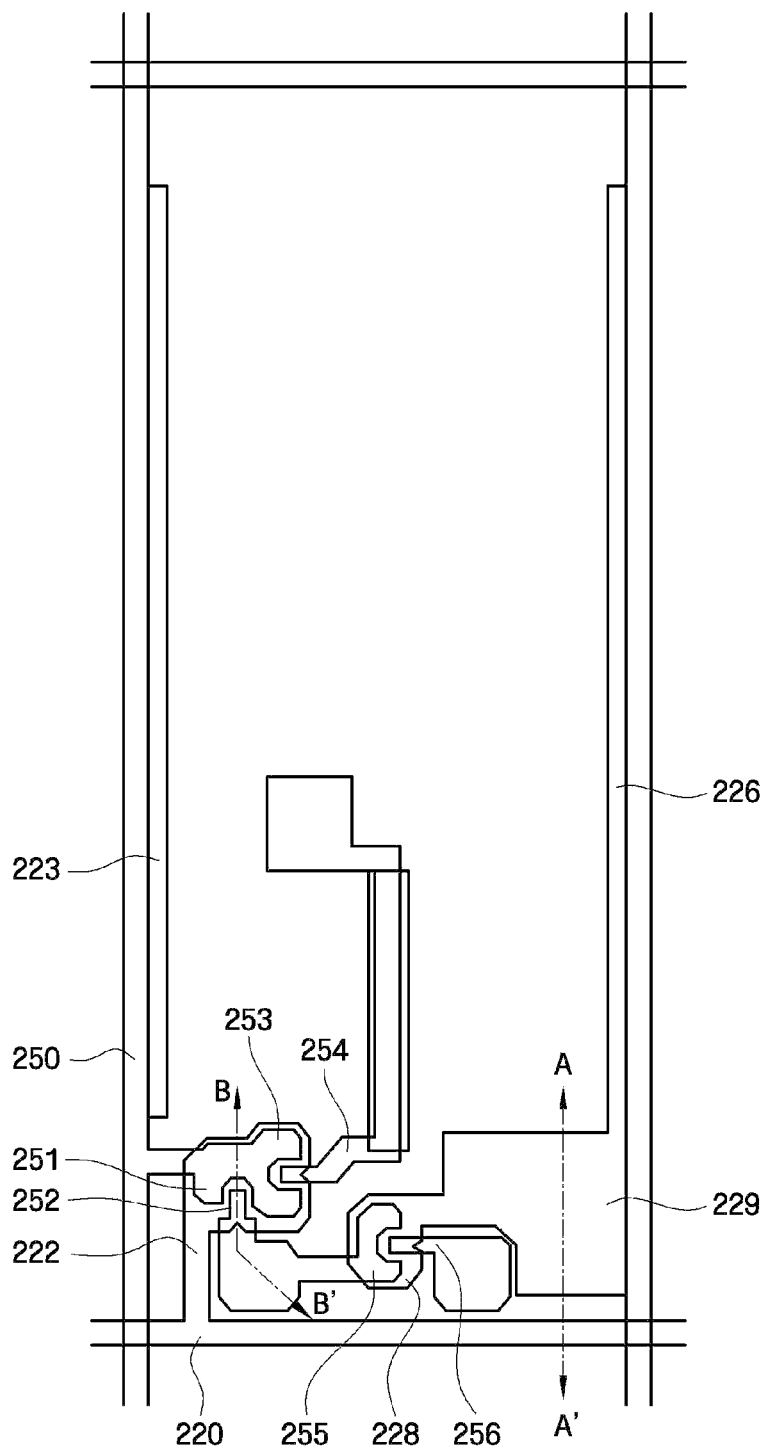
Figure 9:
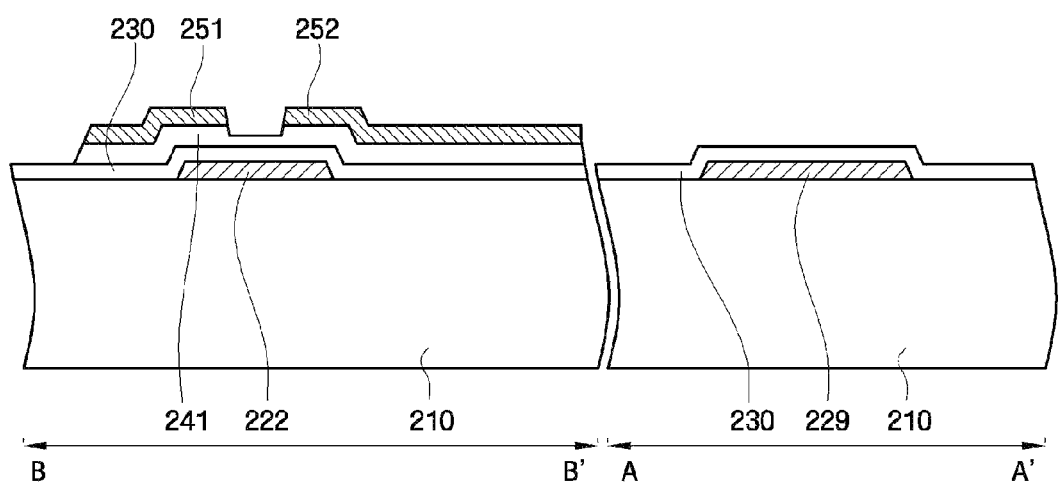

Referring to FIG. 8 and FIG. 9, the gate insulating layer 230, for a semiconductor layer (not shown) and a conductive film for data wiring (not shown) are sequentially formed on the resultant structure of FIG. 6 and FIG. 7. Specifically, the gate insulating layer 230 may be deposited by, e.g., plasma enhanced chemical vapor deposition (PECVD) or reactive sputtering. In this case, the gate insulating layer 230 may be formed of, for example, silicon oxide (SiOx).

Subsequently, an etching mask (not shown) is formed on the conductive film for data wiring. For example, the etching mask has a small thickness at a region corresponding to a channel portion of the switching elements T1, T2 and T3 and a large thickness at a region corresponding to the source and drain electrodes. The etching mask exposes a portion of the conductive film other than the channel portion or source and drain electrodes.

The etching mask having different thicknesses according to positions as described above may be formed by various methods. A mask generally using slits, lattice patterns, or a translucent film may be used to control the amount of transmitted light. Further, exposure may be performed using a general mask which is divided into portions through which light is completely transmitted and portions through which light is not transmitted by using a photoresist film made of a reflowable material. Then, development and reflow may be performed so that the photoresist film partially flows into portions in which the photoresist film was removed.

The semiconductor layer 241 and the data wiring 250, 251, 252, 253, 254, 255 and 256 are formed by patterning the semiconductor layer (not shown) and the conductive film for data wiring (not shown) using the etching mask.

Figure 10:
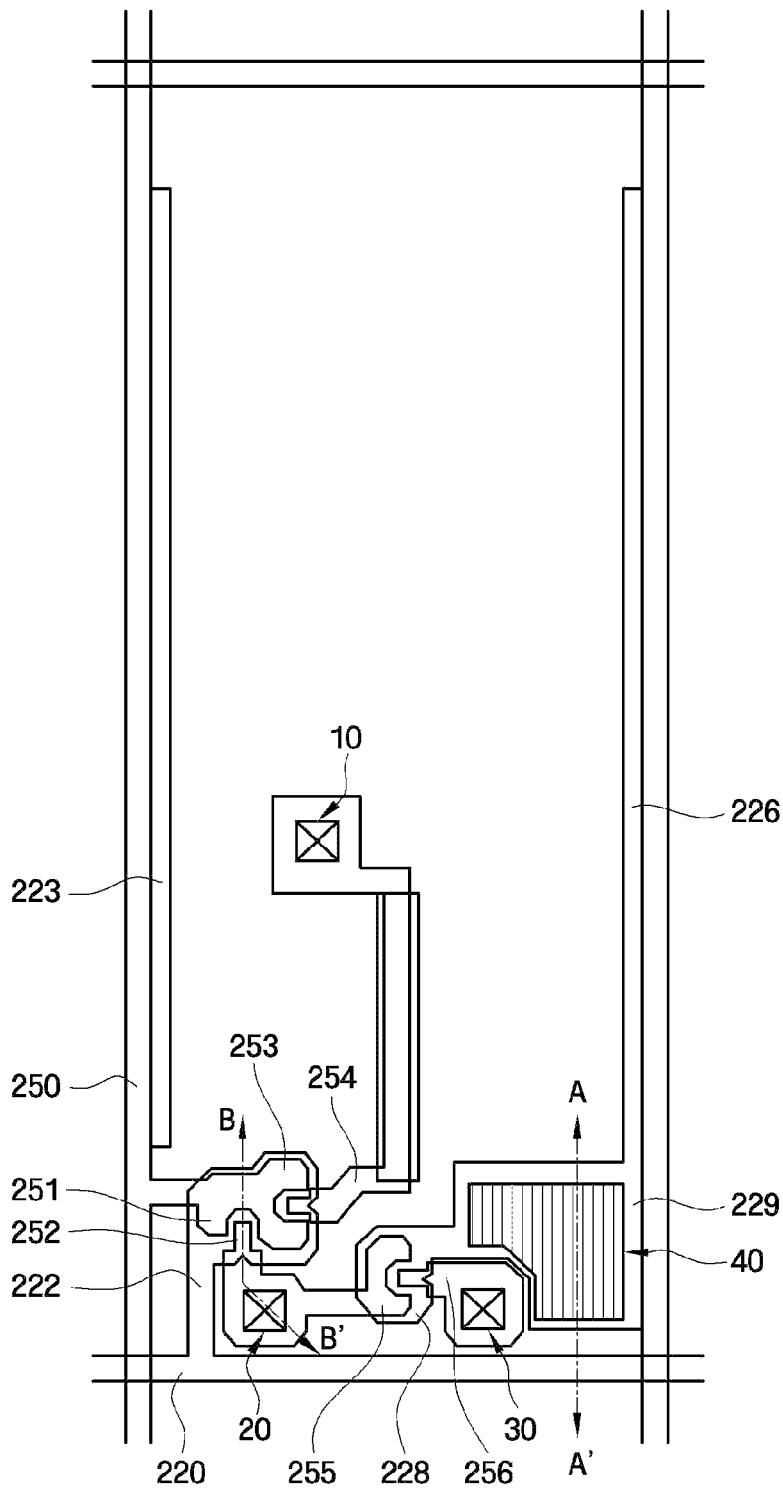
Figure 11:
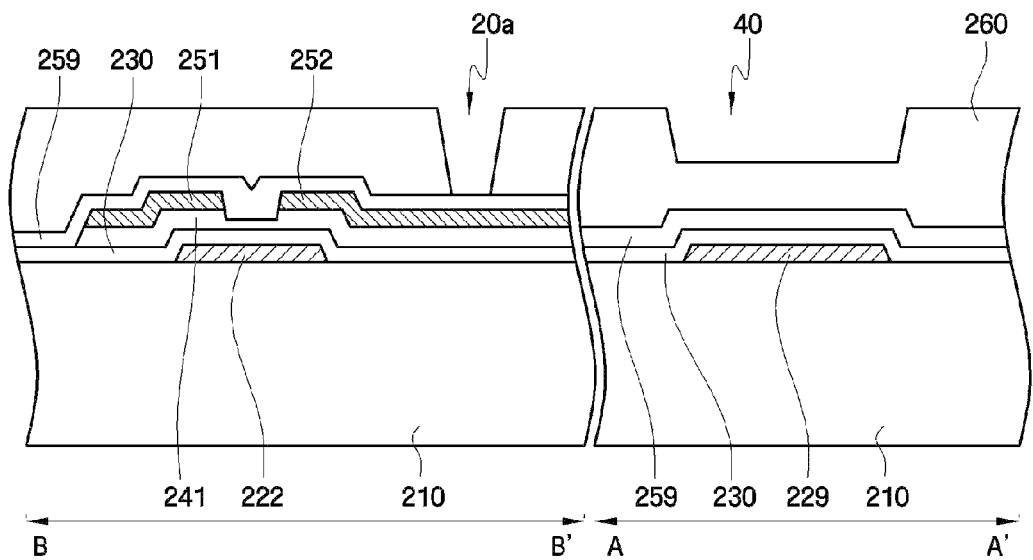

Referring to FIG. 10 and FIG. 11, the passivation layer 259 and 260 is formed on the resultant structure of FIG. 8 and FIG. 9.

Subsequently, the organic film 260 undergoes photolithography and development through the mask using slits, lattice patterns, or a translucent film. The photolithography and development are performed such that a pre-contact hole 20a is formed to have a depth greater than that of the trench 40.

Figure 12:
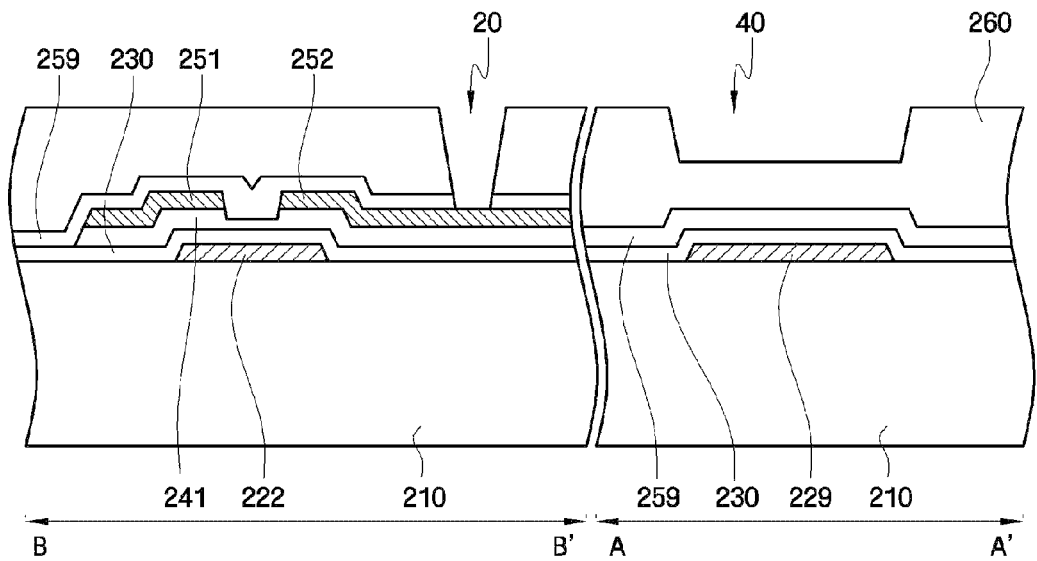

Referring to FIG. 10 and FIG. 12, a portion of the inorganic film 259 is removed to completely form the contact hole 20. The contact hole 20 may be completely formed by wet etching or dry etching. For example, the contact hole 20 may be formed by wet etching using an etching solution having high etching selectivity for the inorganic film 259 and the organic film 260. In this case, the inorganic film 259 is removed (see FIG. 12) by using the same mask as when the organic film 260 is removed (see FIG. 11), that is, without using an additional mask.

Consequently, the contact hole 20 is formed to have a depth greater than that of the trench 40.

Referring again to FIG. 4 and FIG. 5, the first pixel electrode 271, the second pixel electrode 272 and the second capacitor electrode 279 are formed on the passivation layer 259 and 260.

A transparent conductive material such as indium tin oxide (ITO) or indium zinc oxide (IZO) is coated on the passivation layer 259 and 260 and patterned to form the first pixel electrode 271, the second pixel electrode 272 and the second capacitor electrode 279 by using, for example, wet etching or dry etching.

Referring to FIG. 4, FIG. 5, FIG. 6, FIG. 7, FIG. 8, FIG. 9, FIG. 10, FIG. 11, and FIG. 12, the display substrate in accordance with the first exemplary embodiment of the present invention may be formed by using four masks. Accordingly, it may not be required to increase the number of masks or perform a complicated process in order to form the display substrate in accordance with the first exemplary embodiment of the present invention, thereby improving processing efficiency.

Figure 13:
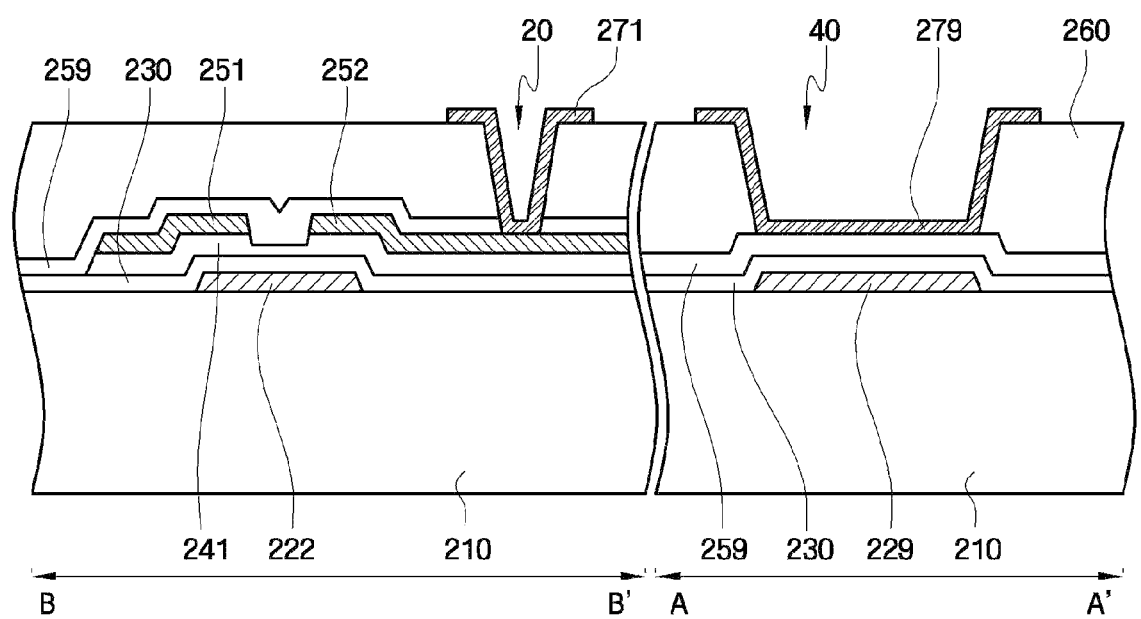
FIG. 13 is a cross sectional view for explaining a display substrate in accordance with a second exemplary embodiment of the present invention.

FIG. 13 is a cross sectional view for explaining a display substrate in accordance with a second exemplary embodiment of the present invention.

Referring to FIG. 13, unlike the first exemplary embodiment, the trench 40 is formed to expose the inorganic film 259.

In the first exemplary embodiment, the organic film 260 is removed using the same mask as when the inorganic film 259 is removed. On the other hand, in the second exemplary embodiment, different masks may be used when the organic film 260 is removed and when the inorganic film 259 is removed.

Figure 14:
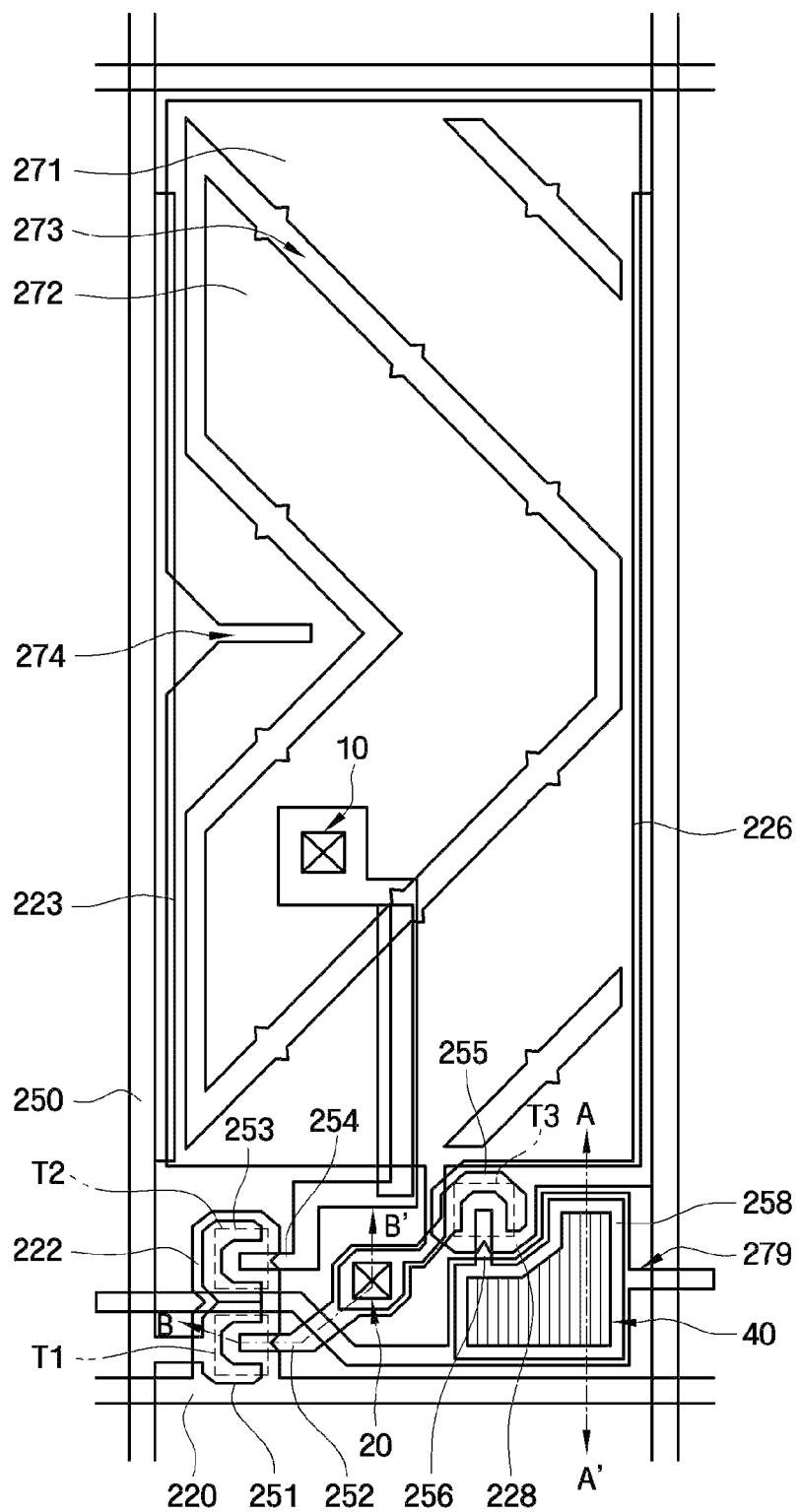
FIG. 14 and FIG. 15 are a layout and a cross sectional view for explaining a display substrate in accordance with a third exemplary embodiment of the present invention.
Figure 15:
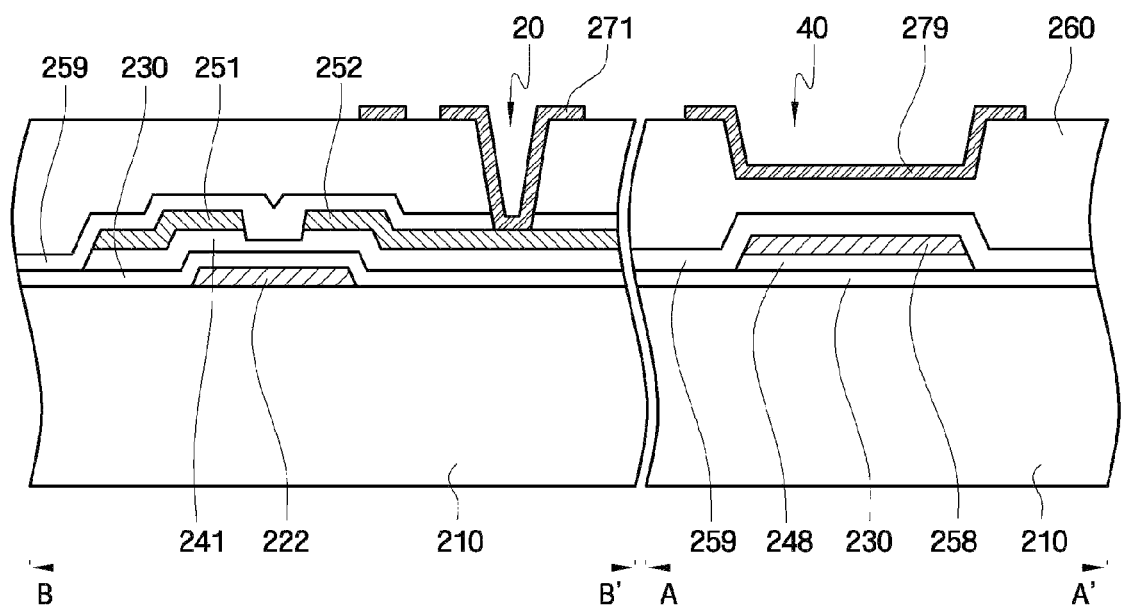

FIG. 14 and FIG. 15 are a layout and a cross sectional view for explaining a display substrate in accordance with a third exemplary embodiment of the present invention.

Referring to FIG. 14 and FIG. 15, a first capacitor electrode 258 of the control capacitor Cd is formed at the same level as the data wiring 250, 251, 252, 253, 254, 255 and 256. The second capacitor electrode 279 is formed at the same level as the pixel electrodes 271 and 272. Since both the first capacitor electrode 258 and the second capacitor electrode 279 are formed of a metal material, the control capacitor Cd is a MIM capacitor. In the MIM capacitor, the capacitance may have a small change according to the applied voltage. Accordingly, the MIM capacitor may have a higher stability than a MIS capacitor.

The gate wiring 220 and 222, the first storage line 223, the second storage line 226 and the like are formed on the substrate 210. The gate wiring 220 and 222 includes the first gate line 220 extending in a horizontal direction and the gate electrode 222 connected to the first gate line 220. The storage lines 223 and 226 overlap with the pixel electrodes 271 and 272 and the like to form a capacitor. The gate electrode 222 may include a first gate electrode of the first switching element T1 and a second gate electrode of the second switching element T2. The gate electrode 228 may be a third gate electrode of the control switching element T3.

The gate insulating layer 230 is formed on the substrate 210 to cover the gate wiring 220 and 222, the first and second storage lines 223 and 226 and the first capacitor electrode 229.

The semiconductor layer 241 made of a semiconductor such as hydrogenated amorphous silicon is formed on the gate insulating layer 230 disposed on the gate electrode 222. A semiconductor layer 248 is formed on a region (indicated by line A-A') where the control capacitor Cd will be formed.

The data wiring 250, 251, 252, 253, 254, 255 and 256 and the first capacitor electrode 258 are formed on the semiconductor layers 241 and 248. The data wiring 250, 251, 252, 253, 254, 255 and 256 includes the data line 250, the source electrodes 251, 253 and 255, and the drain electrodes 252, 254 and 256 separated from the source electrodes 251, 253 and 255 and formed opposite to the source electrodes 251, 253 and 255. Further, the first capacitor electrode 258 is formed on the semiconductor layer 248.

The passivation layer 259 and 260 is formed on the data wiring 250, 251, 252, 253, 255 and 256 and the semiconductor layer 241. The contact holes 10 and 20 and the trench 40 are formed in the passivation layer 259 and 260. The contact holes 10 and 20 may have a depth greater than that of the trench 40.

The pixel electrodes 271 and 272 are formed on the passivation layer 260. Further, the second capacitor electrode 279 is formed on the trench 40. As described above, the pixel electrodes 271 and 272 and the second capacitor electrode 279 may be formed at the same level.

FIG. 16, FIG. 17, FIG. 18, FIG. 19, FIG. 20, FIG. 21, and FIG. 22 show intermediate steps for fabricating the display device in accordance with the third exemplary embodiment of the present invention.

Figure 16:
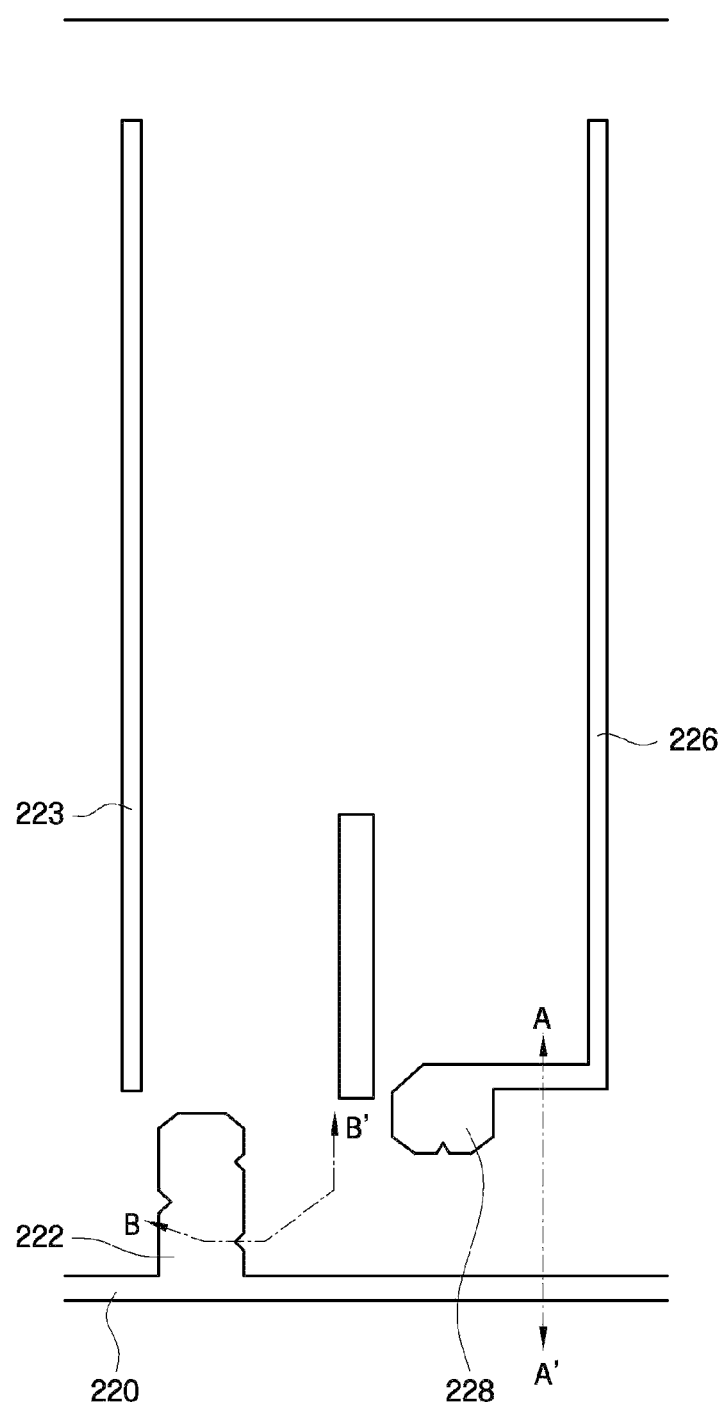
FIG. 16, FIG. 17, FIG. 18, FIG. 19, FIG. 20, FIG. 21, and FIG. 22 show intermediate steps for fabricating the display device in accordance with the third exemplary embodiment of the present invention.
Figure 17:
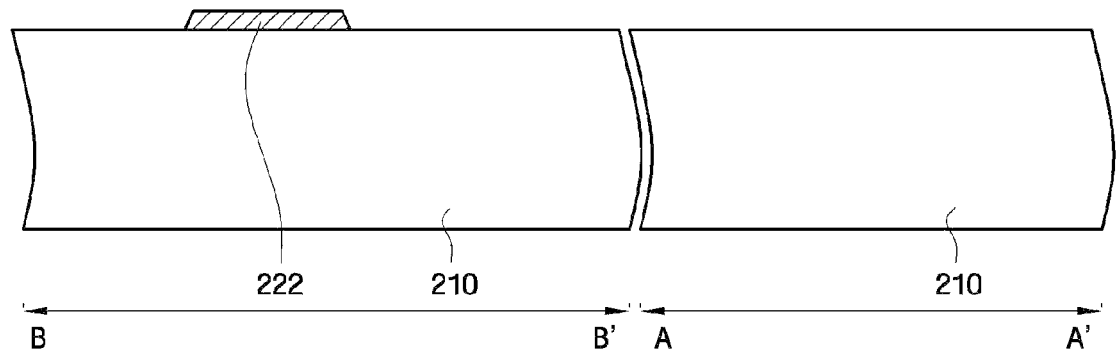

Referring to FIG. 16 and FIG. 17, first, the gate wiring 220 and 222, the first storage line 223 and the second storage line 226, the first gate electrode 228, and the like are formed on the substrate 210.

Figure 18:
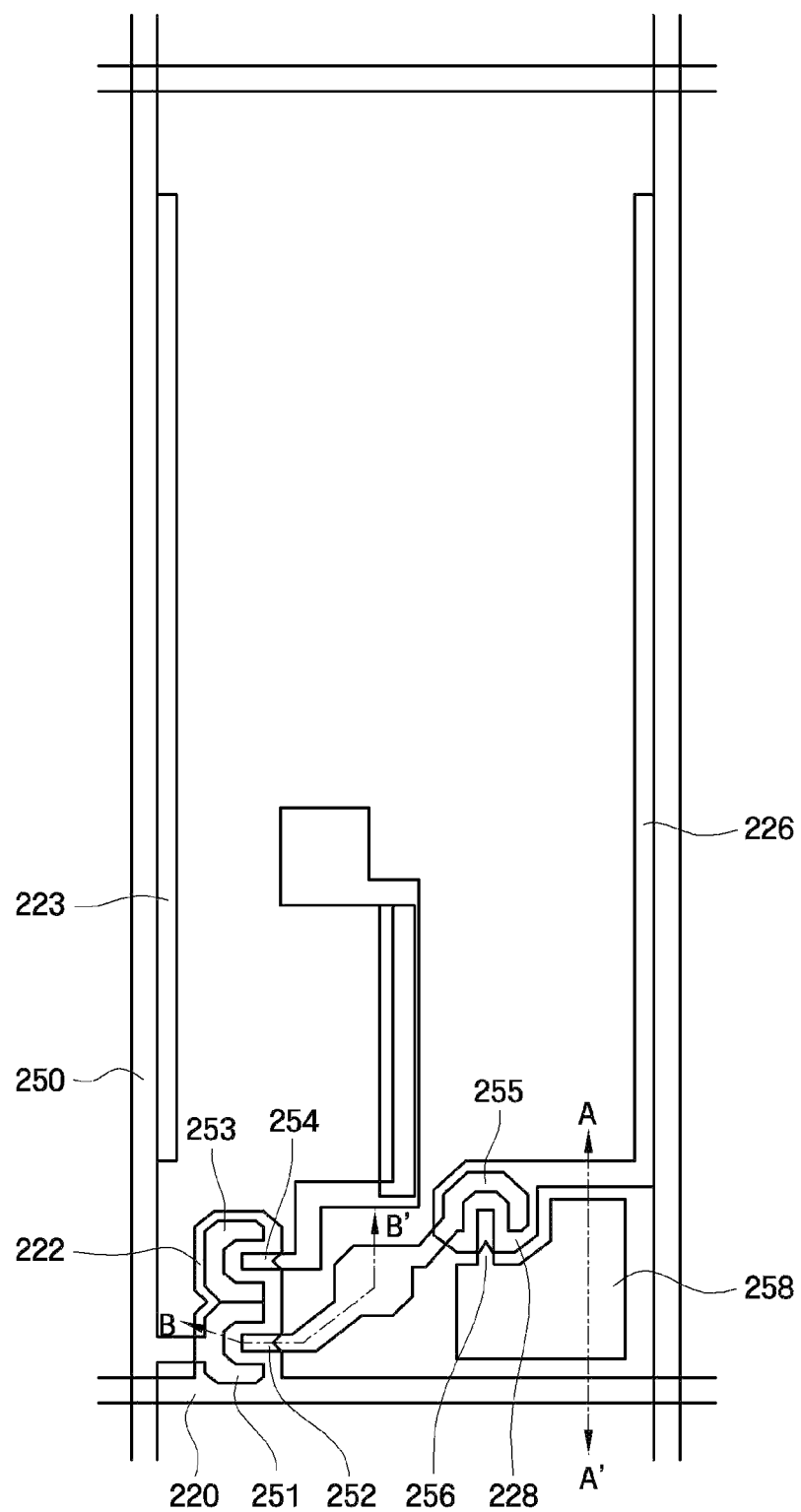
Figure 19:
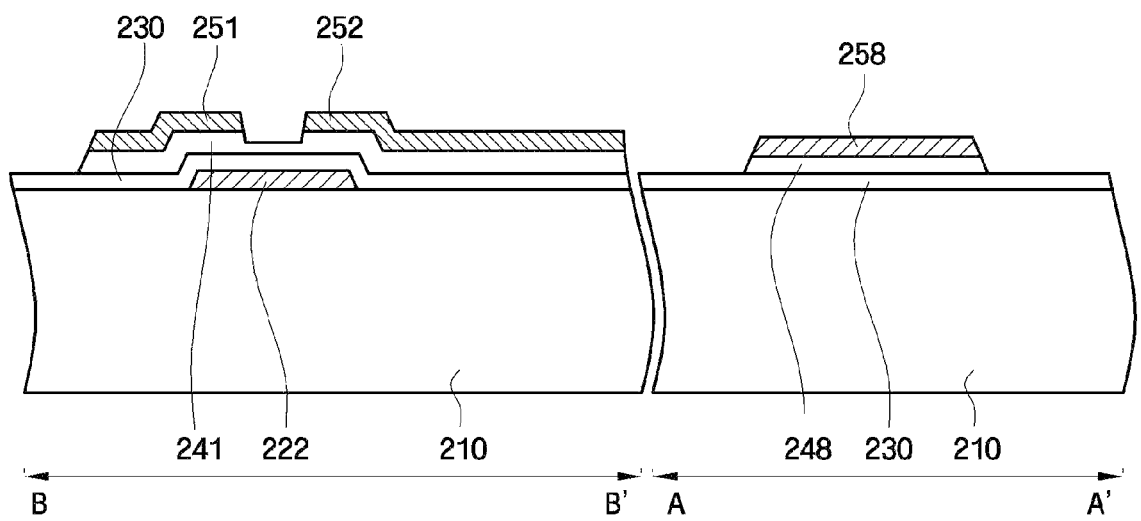

Referring to FIG. 18 and FIG. 19, the gate insulating layer 230, the semiconductor layers 241 and 248, the data wiring 250, 251, 252, 253, 254, 255 and 256 and the first capacitor electrode 258 are sequentially formed on the resultant structure of FIG. 16 and FIG. 17.

Figure 20:
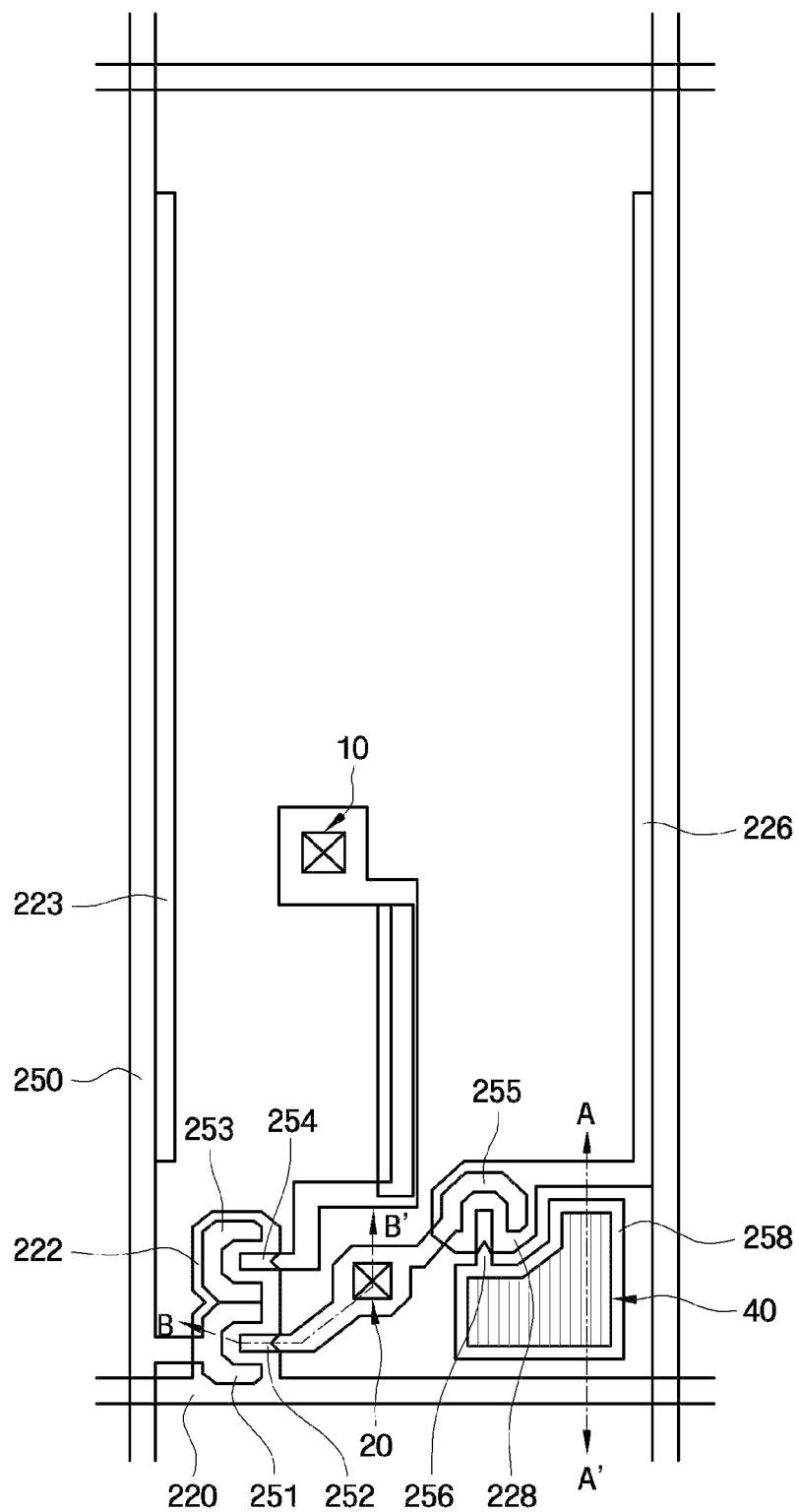
Figure 21:
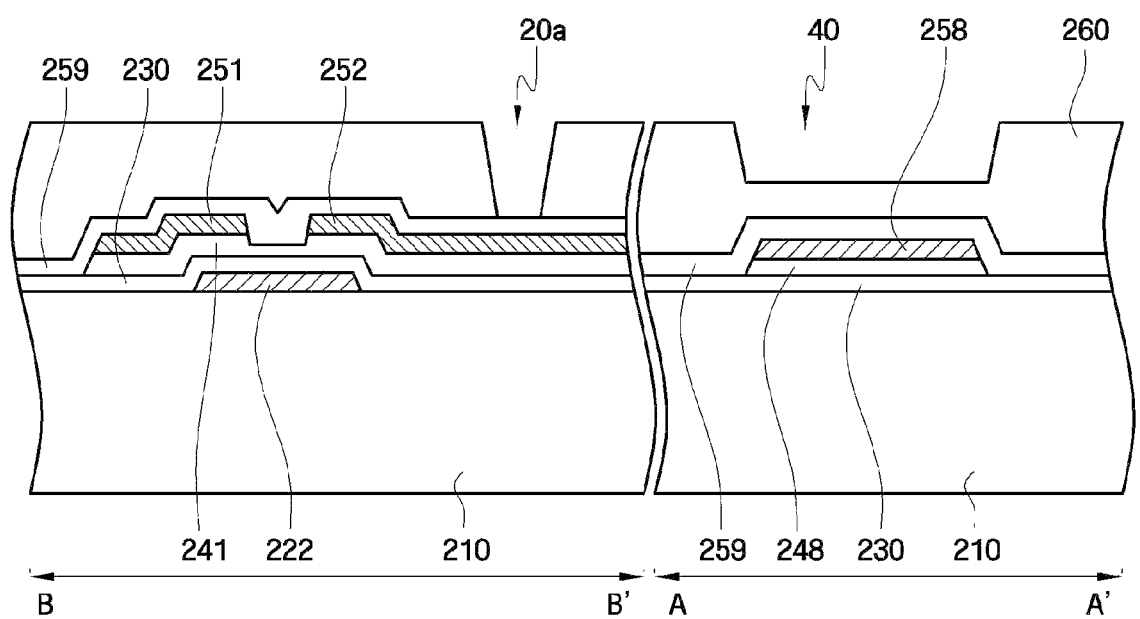

Referring to FIG. 20 and FIG. 21, the passivation layer 259 and 260 is formed on the resultant structure of FIG. 18 and FIG. 19.

Subsequently, the organic film 260 undergoes photolithography and development through a mask using slits, lattice patterns, or a translucent film. The photolithography and development are performed such that the pre-contact hole 20a is formed to have a depth greater than that of the trench 40.

Subsequently, a portion of the inorganic film 259 is removed to completely form the contact hole 20.

Referring again to FIG. 14 and FIG. 15, the first pixel electrode 271, the second pixel electrode 272 and the second capacitor electrode 279 are formed on the passivation layer 259 and 260.

Figure 22:
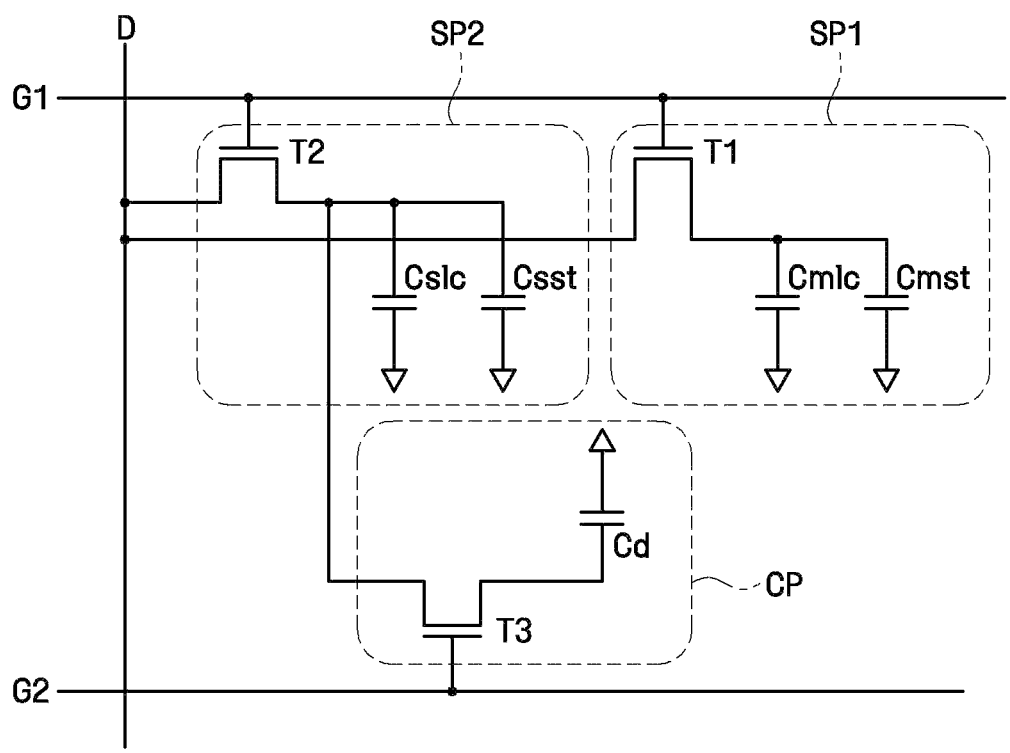

FIG. 22 shows an equivalent circuit diagram of a pixel I used in a display substrate in accordance with a fourth exemplary embodiment of the present invention Referring to FIG. 22, the pixel I is connected to gate lines G1 and G2 and a data line D. The pixel I includes a first sub-pixel SP1, a second sub-pixel SP2, and a controller CP. The two gate lines G1 and G2 are arranged adjacent to each other. The gate line G2 may be a next gate line which is disposed next to the gate line G1. That is, after a gate voltage is applied to the gate line G1, a gate voltage may be applied to the gate line G2.

Particularly, the gate electrode of the control switching element T3 of the controller CP is connected to the gate line (second gate line) G2. Accordingly, the control switching element T3 is turned on when a gate voltage is applied to the gate line G2. The second liquid crystal capacitor Cslc and the second storage capacitor Csst share charges with each other. Accordingly, the voltage charged in the second liquid crystal capacitor Cslc is changed.

Figure 23:
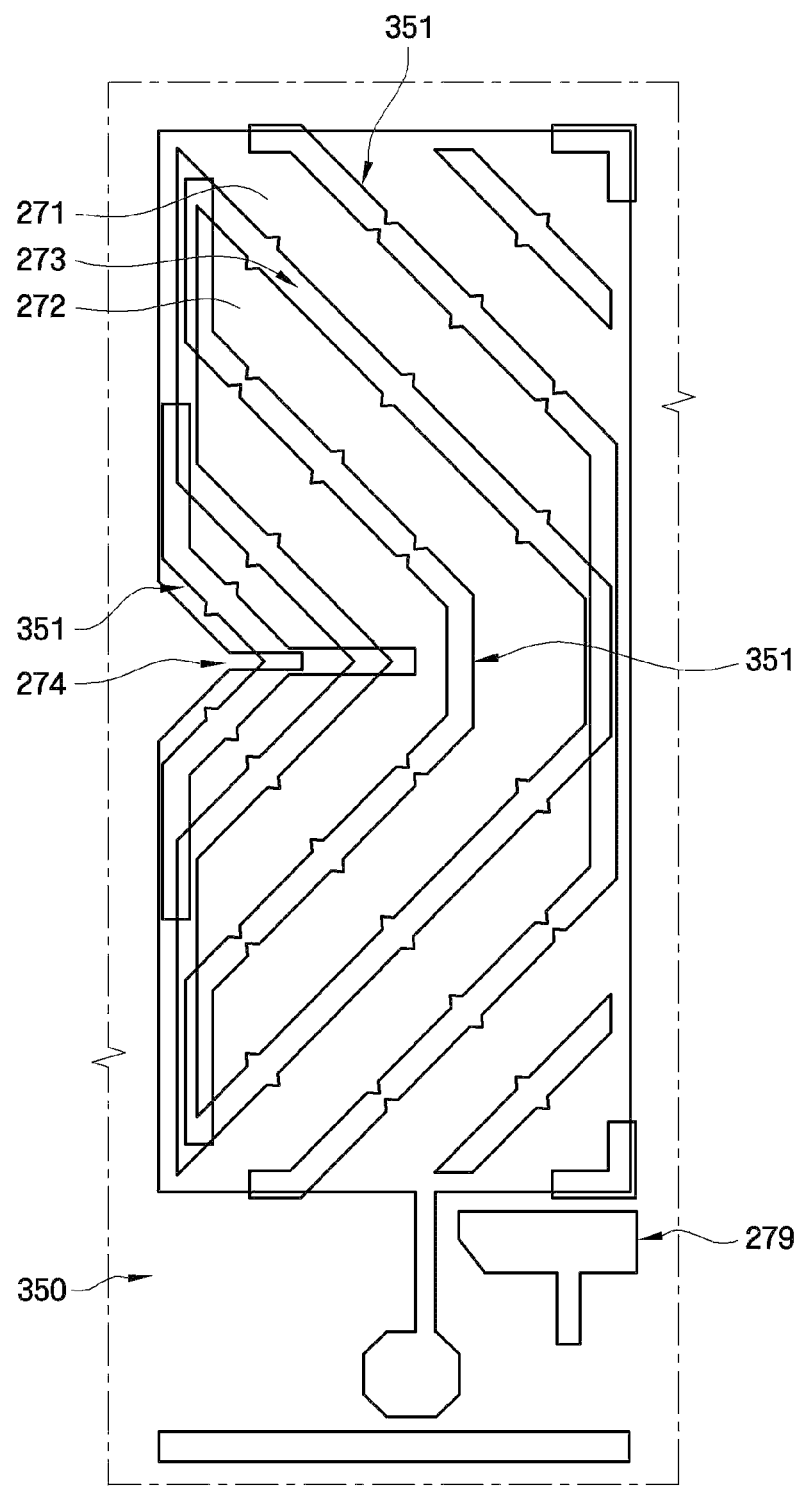
FIG. 23 shows a layout for explaining the display device in accordance with a fourth exemplary embodiment of the present invention.
Figure 24:
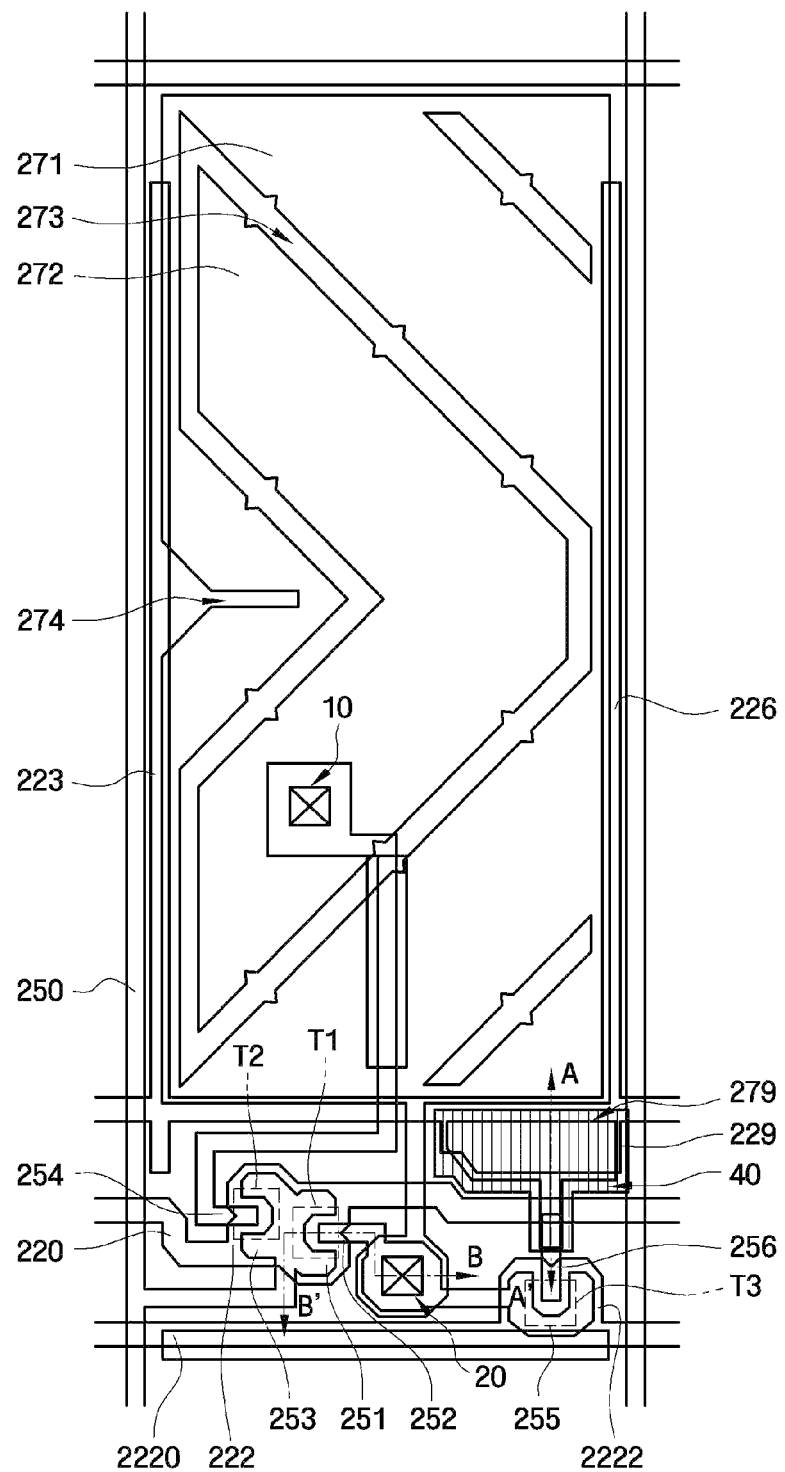
FIG. 24 and FIG. 25 are a layout and a cross sectional view for explaining the display device in accordance with a fourth exemplary embodiment of the present invention.
Figure 25:
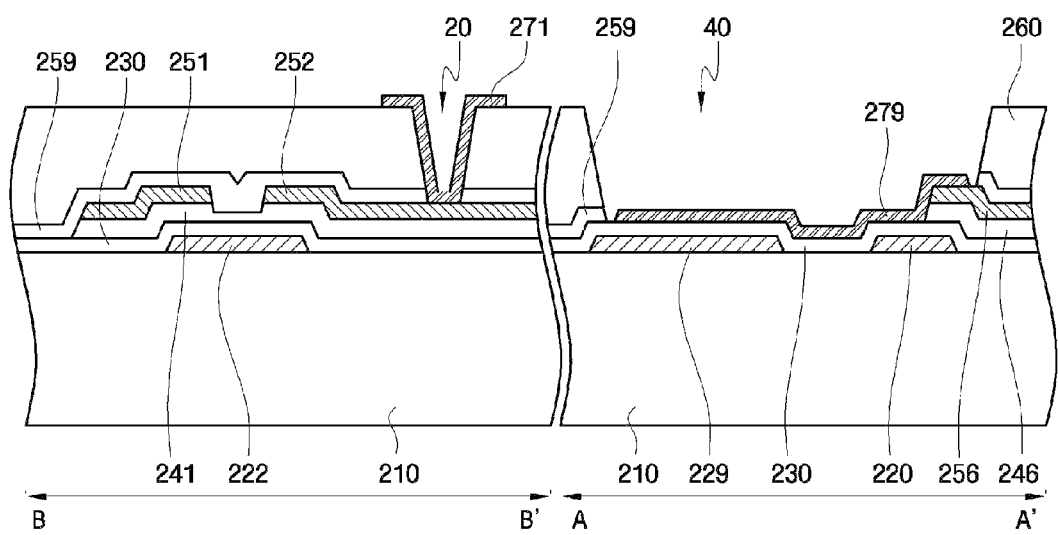

FIG. 23 shows a layout for explaining the display device in accordance with the fourth exemplary embodiment of the present invention. Specifically, FIG. 23 shows a layout of the pixel electrodes and the common electrode in the display device including the pixel of FIG. 22. FIG. 24 and FIG. 25 are a layout and a cross sectional view for explaining the display device in accordance with the fourth exemplary embodiment of the present invention. FIG. 25 is a cross sectional view taken along lines A-A' and B-B' of FIG. 24.

First, referring to FIG. 23, a lower plate includes the first pixel electrode 271 and the second pixel electrode 272, and an upper plate includes the common electrode 350 facing the pixel electrodes 271 and 272. The second capacitor electrode 279 is formed at the same level as the first and second pixel electrodes 271 and 272.

Referring to FIG. 24 and FIG. 25, the first capacitor electrode 258 of the control capacitor Cd is formed at the same level as the gate wiring 220 and 222, 2220 and 2222. The second capacitor electrode 279 is formed at the same level as the pixel electrodes 271 and 272.

The gate wiring 220 and 222, 2220 and 2222, the first storage line 223, the second storage line 226, the first capacitor electrode 229 and the like are formed on the substrate 210. The gate wiring 220 and 222, 2220 and 2222 includes the first gate line 220 extending in a horizontal direction and the gate electrode 222 connected to the first gate line 220, a second gate line 2220 extending in parallel with the first gate line 220, and a gate electrode 2222 connected to the second gate line 2220. The storage lines 223 and 226 overlap with the pixel electrodes 271 and 272 and the like to form a capacitor. The gate electrode 222 may include a first gate electrode of the first switching element T1 and a second gate electrode of the second switching element T2. The gate electrode 2222 may be a third gate electrode of the control switching element T3.

The semiconductor layer 241 made of a semiconductor such as hydrogenated amorphous silicon is formed on the gate insulating layer 230 disposed on the gate electrode 222.

The data wiring 250, 251, 252, 253, 254, 255 and 256 is formed on the semiconductor layer 241. The data wiring 250, 251, 252, 253, 254, 255 and 256 includes the data line 250, the source electrodes 251, 253 and 255, and the drain electrodes 252, 254 and 256 separated from the source electrodes 251, 253 and 255 and formed opposite to the source electrodes 251, 253 and 255. Particularly, the drain electrode 256 is arranged such that a portion of the gate electrode 2222 overlaps with a portion of the first gate line 220.

The passivation layer 259 and 260 is formed on the data wiring 250, 251, 252, 253, 254, 255 and 256 and the semiconductor layer 241. The contact holes 10 and 20 and the trench 40 are formed in the passivation layer 259 and 260.

In the present exemplary embodiment, the contact holes 10 and 20 are respectively formed to partially expose the drain electrodes 254 and 252. Further, the trench 40 may be formed to expose the gate insulating layer 230 at a region (indicated by line A-A') where the control capacitor Cd will be formed, but it is not limited thereto.

The pixel electrodes 271 and 272 are formed on the passivation layer 260. Further, the second capacitor electrode 279 is formed on the trench 40. As described above, the pixel electrodes 271 and 272 and the second capacitor electrode 279 may be formed at the same level. The second capacitor electrode 279 is arranged to be directly in contact with the drain electrode 256. The second capacitor electrode 279 and the first capacitor electrode 229 form the control capacitor Cd.

FIG. 26, FIG. 27, FIG. 28, FIG. 29, FIG. 30, FIG. 31, FIG. 32, FIG. 33, and FIG. 34 show intermediate steps for fabricating the display device in accordance with the fourth exemplary embodiment of the present invention.

Figure 26:
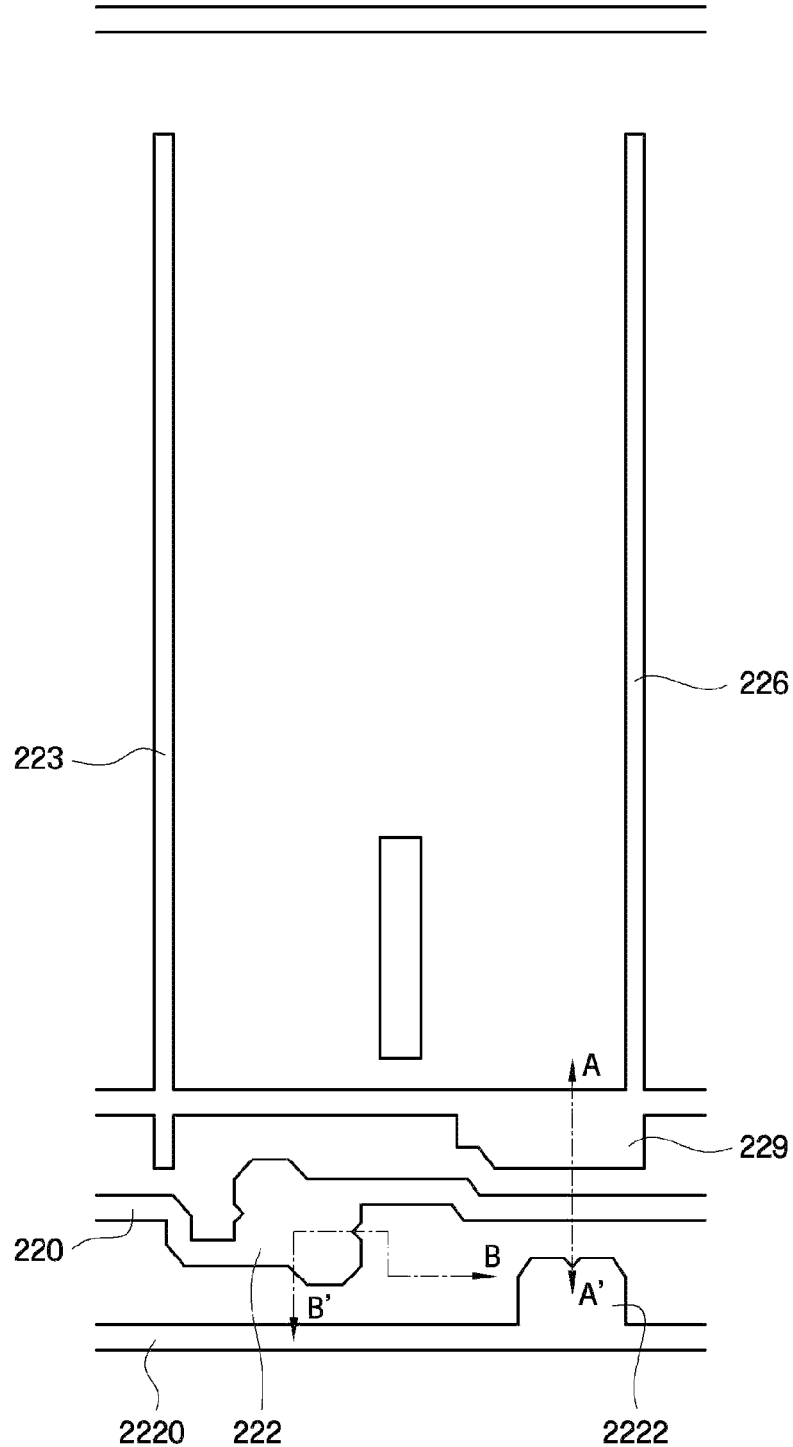
FIG. 26, FIG. 27, FIG. 28, FIG. 29, FIG. 30, FIG. 31, FIG. 32, FIG. 33, and FIG. 34 show intermediate steps for fabricating the display device in accordance with the fourth exemplary embodiment of the present invention.
Figure 27:
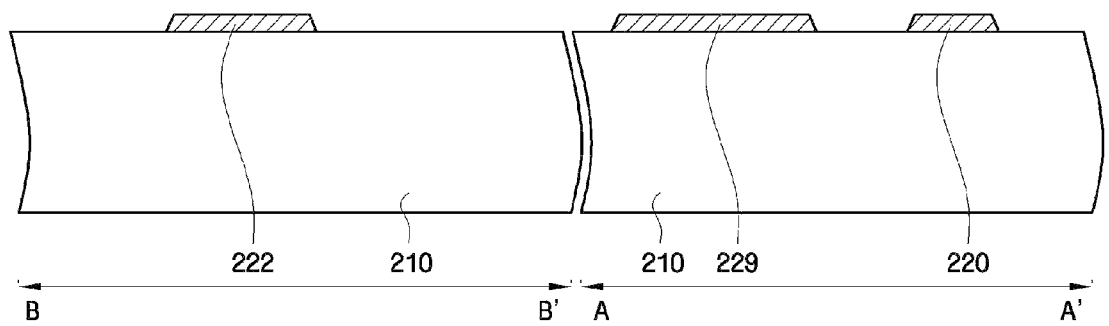

Referring to FIG. 26 and FIG. 27, first, the gate wiring 220 and 222, 2220 and 2222, the first storage line 223 and the second storage line 226, the first storage electrode 229 and the first capacitor electrode 229 and the like are formed on the substrate 210.

Figure 28:
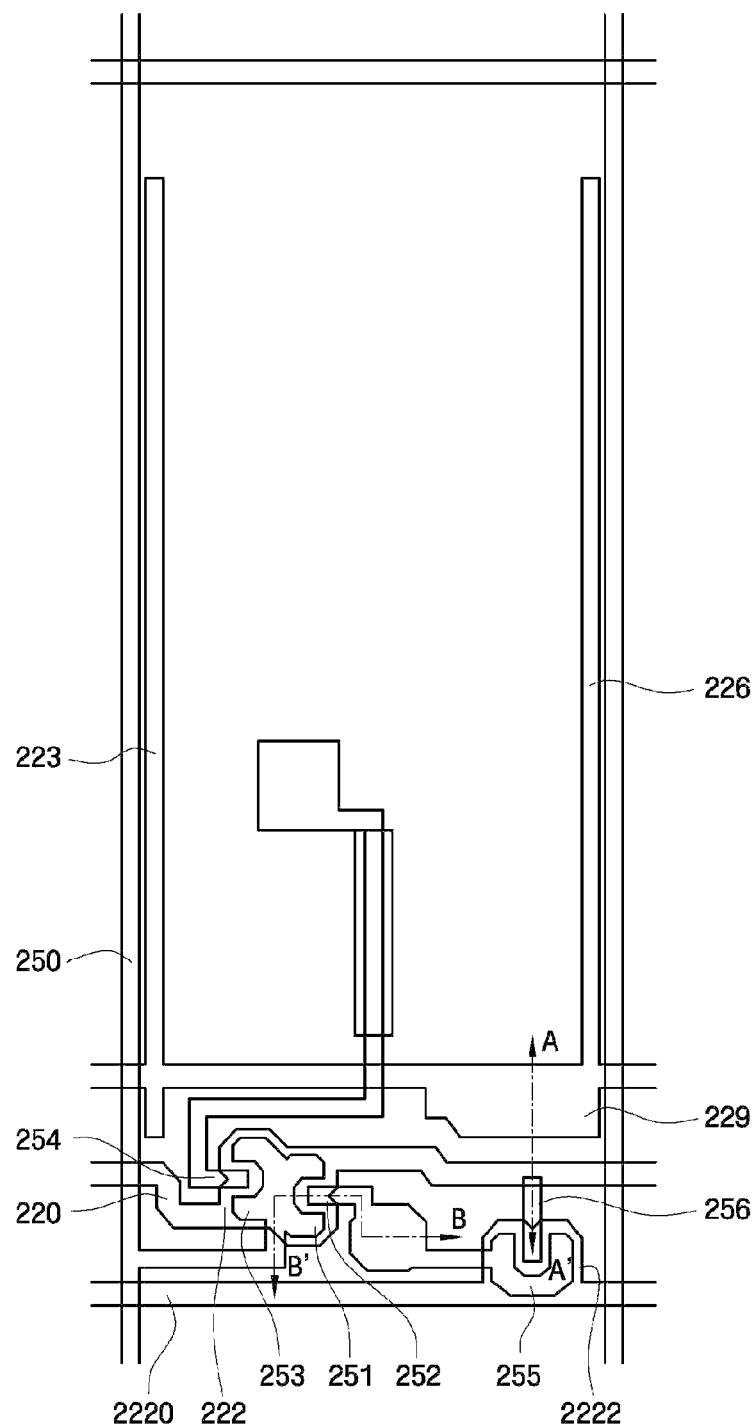
Figure 29:
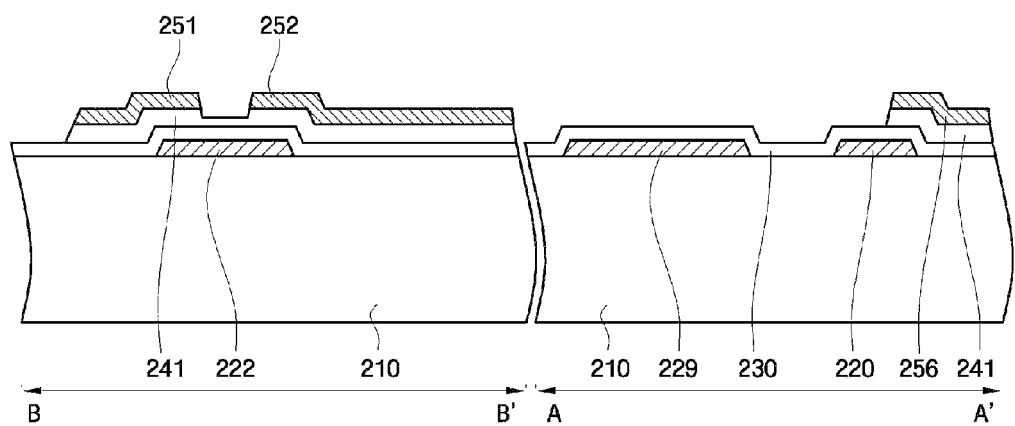

Referring to FIG. 28 and FIG. 29, the gate insulating layer 230, the semiconductor layer 241 and the data wiring 250, 251, 252, 253, 254, 255 and 256 are formed on the resultant structure of FIG. 26 and FIG. 27.

Figure 30:
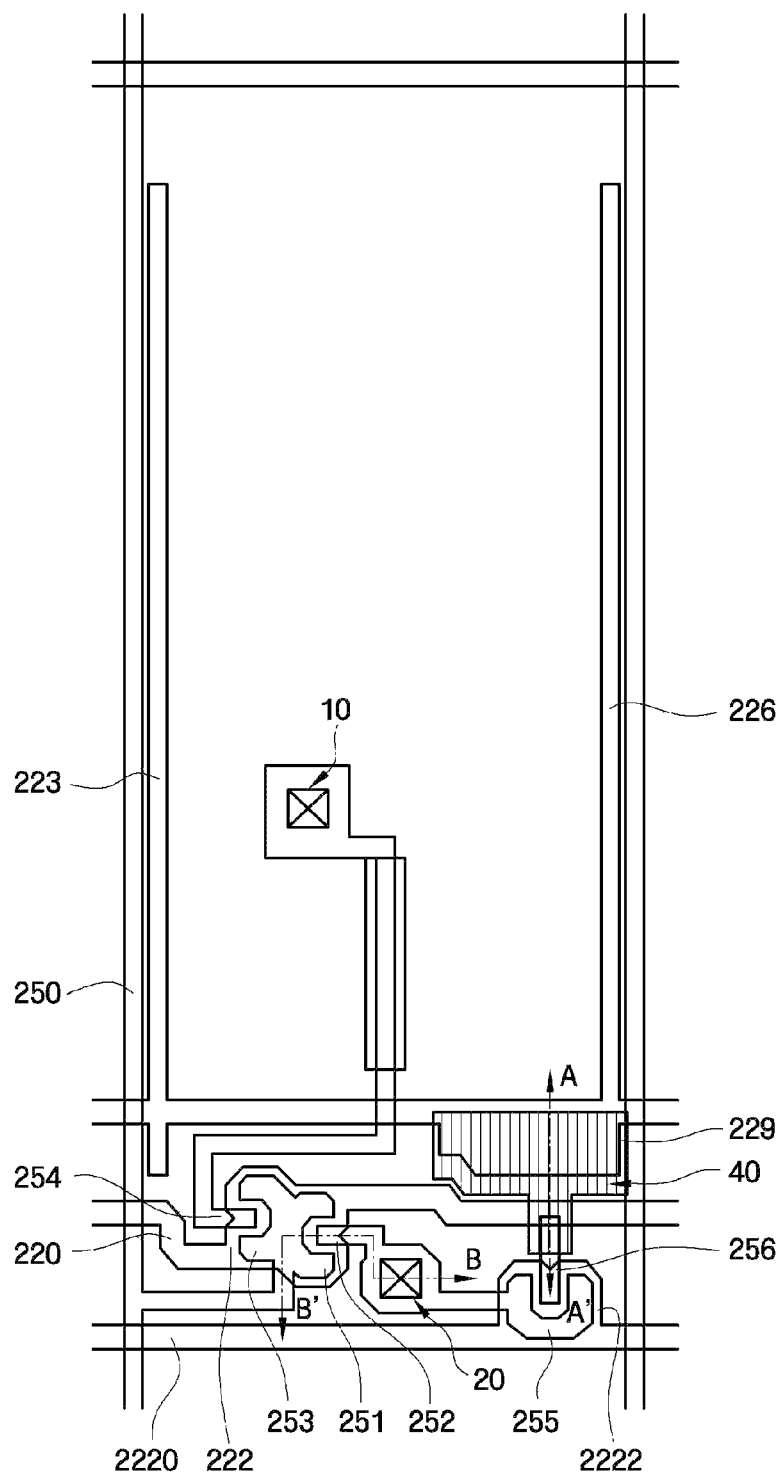
Figure 31:
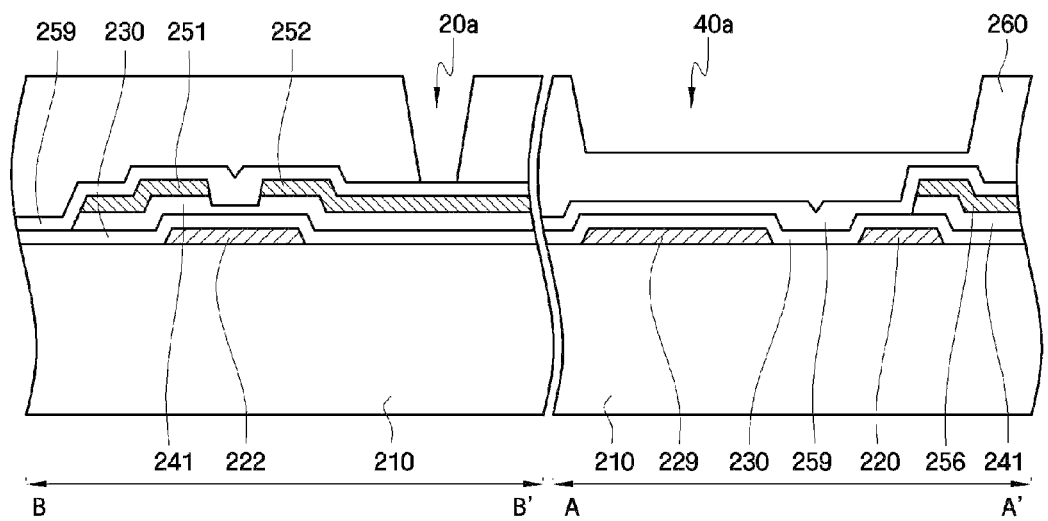
Figure 32:
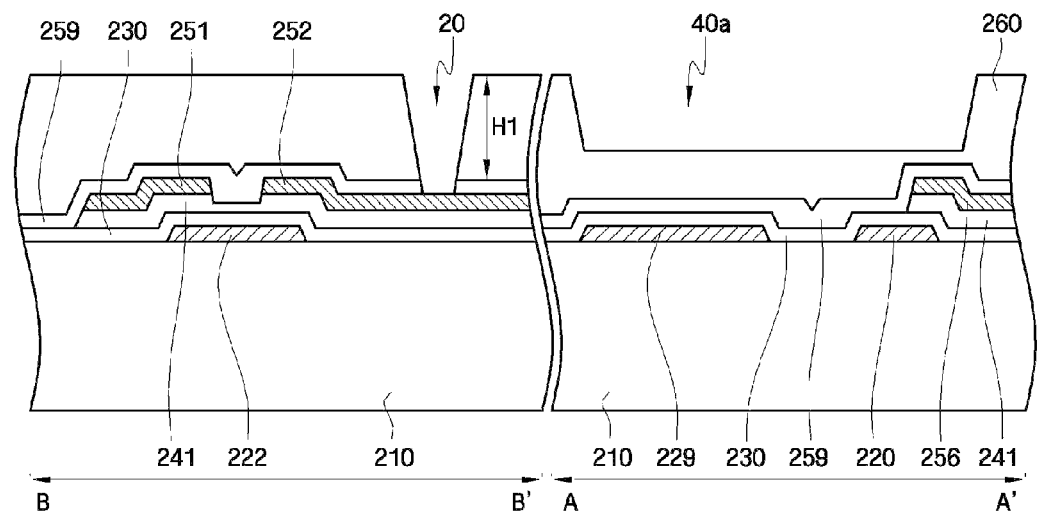

Referring to FIG. 30 and FIG. 31, the passivation layer 259 and 260 is formed on the resultant structure of FIG. 28 and FIG. 29.

Subsequently, the organic film 260 undergoes photolithography and development through a mask using slits, lattice patterns, or a translucent film. The photolithography and development are performed such that the pre-contact hole 20a is formed to have a depth greater than that of the trench 40a.

Referring again to FIG. 30 and FIG. 32, a portion of the inorganic film 259 is removed to completely form the contact hole 20.

Referring again to FIG. 30 and FIG. 33, the organic film 260 is ashed to expose a portion of the inorganic film 259 at a region (indicated by line A-A') where the control capacitor Cd will be formed.

Figure 33:
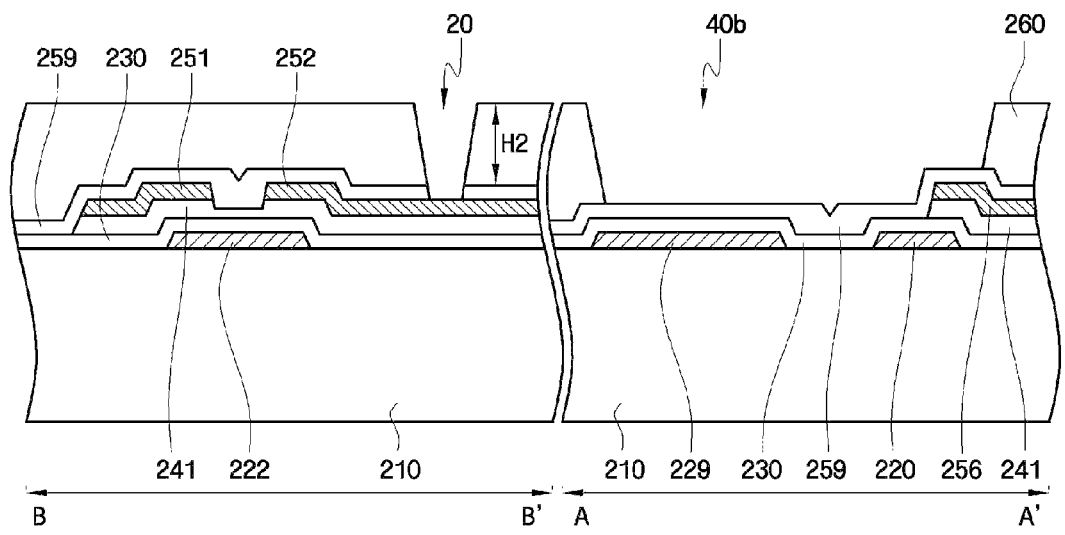

Since the organic film 260 is ashed, the entire thickness of the organic film 260 decreases. That is, a thickness H2 of the organic film 260 shown in FIG. 33 is smaller than a thickness H1 of the organic film 260 shown in FIG. 32.

Figure 34:
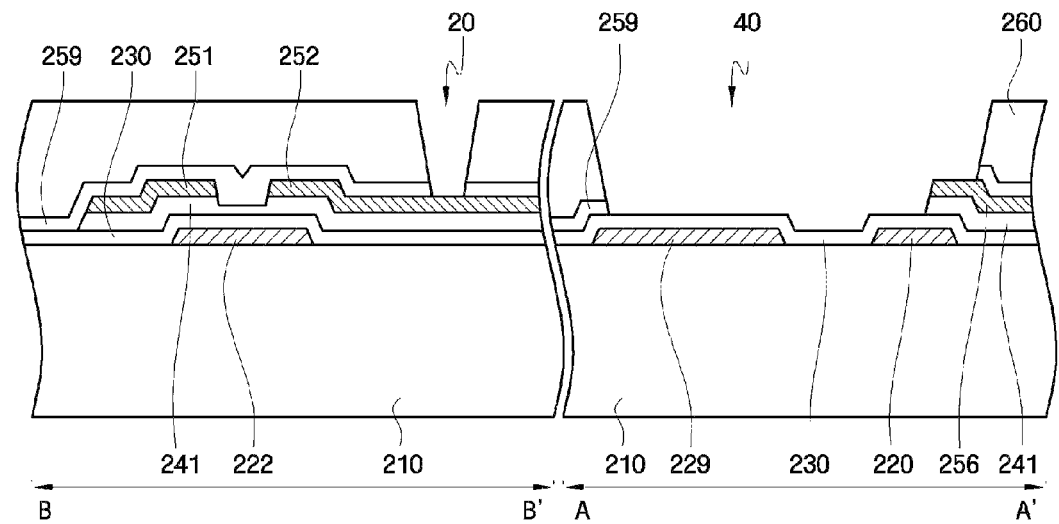

Referring to FIG. 30 and FIG. 34, the trench 40 is completely formed by removing a portion of the inorganic film 259 at a region (indicated by line A-A') where the control capacitor Cd will be formed.

Referring again to FIG. 24 and FIG. 25, the first pixel electrode 271, the second pixel electrode 272 and the second capacitor electrode 279 are formed on the passivation layer 259 and 260.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A display substrate, comprising:
a pixel connected to a first gate line and a data line, wherein the pixel comprises:
a first sub-pixel comprising a first liquid crystal capacitor and a first switching element comprising a gate electrode connected to the first gate line, a source electrode connected to the data line, and a drain electrode connected to the first liquid crystal capacitor;
a second sub-pixel comprising a second liquid crystal capacitor and a second switching element comprising a gate electrode connected to the first gate line, a source electrode connected to the data line, and a drain electrode connected to the second liquid crystal capacitor; and
a controller comprising a control capacitor and a control switching element, the control switching element connected between a terminal of the control capacitor and the drain electrode of the second switching element,
wherein the control capacitor comprises a first capacitor electrode and a second capacitor electrode,
the first capacitor electrode is arranged on the same level on the display substrate as the gate electrode or is arranged on the same level on the display substrate as the source electrode and the drain electrode, and
the second capacitor electrode is arranged on the same level on the display substrate as a pixel electrode.

2. The display substrate of claim 1, wherein a control terminal of the control switching element is connected to either the first capacitor electrode or the second capacitor electrode.

3. The display substrate of claim 1, further comprising a second gate line, wherein a control terminal of the control switching element is connected to the second gate line.

4. A display substrate, comprising:
a substrate;
a first gate electrode and a first capacitor electrode arranged on the substrate;
a gate insulating layer arranged on the first gate electrode and the first capacitor electrode;
a semiconductor pattern arranged on the gate insulating layer;
a first source electrode and a first drain electrode arranged on the semiconductor pattern, the first source electrode and the first drain electrode being spaced apart from each other;
a first pixel electrode connected to the first drain electrode;
a second capacitor electrode arranged on the gate insulating layer, the second capacitor electrode arranged on the same level on the substrate as the first pixel electrode and spaced apart from the first pixel electrode;
a passivation layer arranged on the first source electrode and the first drain electrode; and
a trench formed in the passivation layer at a position corresponding to the first capacitor electrode,
wherein:
the first and second capacitor electrodes face each other to form a capacitor;
no part of the second capacitor electrode physically contacts the first capacitor electrode; and
the second capacitor electrode is arranged in the trench.

5. The display substrate of claim 4, wherein the passivation layer comprises a contact hole exposing a portion of the first drain electrode, and
a first contact is arranged in the contact hole to connect the first drain electrode with the first pixel electrode.

6. The display substrate of claim 5, wherein the contact hole has a depth greater than that of the trench.

7. The display substrate of claim 4, further comprising a second gate electrode arranged on the substrate;
a second source electrode and a second drain electrode arranged on the second gate electrode and spaced apart from each other; and
a second pixel electrode arranged on the passivation layer, the second pixel electrode connected to the second drain electrode.

8. The display substrate of claim 7, further comprising:
a first gate line and a second gate line arranged adjacent to each other, wherein the first gate electrode protrudes from the first gate line and a third gate electrode protrudes from the second gate line; and
a third source electrode and a third drain electrode arranged on the third gate electrode and spaced apart from each other, wherein the third source electrode is electrically connected to the second drain electrode.

9. The display substrate of claim 8, wherein the second capacitor electrode is arranged directly on the gate insulating layer.

10. The display substrate of claim 4, wherein the passivation layer comprises:
an inorganic film arranged on the first source electrode, the first drain electrode, and the gate insulating layer; and
an organic film arranged on the inorganic film.

11. The display substrate of claim 4, wherein a lateral profile of each of the semiconductor pattern, the first source electrode, and the first drain electrode are connected with each other.

12. A display substrate, comprising:
a substrate;
a first gate electrode arranged on the substrate;
a gate insulating layer arranged on the first gate electrode;
a first semiconductor pattern and a second semiconductor pattern arranged on the gate insulating layer;
a first source electrode and a first drain electrode arranged on the first semiconductor pattern, and a first capacitor electrode arranged on the second semiconductor pattern;
a passivation layer arranged on the first source electrode, the first drain electrode, and the first capacitor electrode;
a first pixel electrode arranged on the passivation layer, the first pixel electrode connected to the first drain electrode;
a trench formed in the passivation layer at a position corresponding to the first capacitor electrode; and
a second capacitor electrode arranged in the trench, the first capacitor electrode and the second capacitor electrode being opposing electrodes of a capacitor, and the second capacitor electrode being completely spaced apart from the first pixel electrode.

13. The display substrate of claim 12,
wherein the second capacitor electrode is arranged on the same level on the substrate as the first pixel electrode.

14. The display substrate of claim 13, wherein the passivation layer comprises a contact hole exposing a portion of the first drain electrode,
a first contact is arranged in the contact hole to connect the first drain electrode with the first pixel electrode, and
the contact hole has a depth greater than that of the trench.

15. The display substrate of claim 12, further comprising:
a second gate electrode arranged on the substrate;
a second source electrode and a second drain electrode arranged on the second gate electrode and spaced apart from each other; and
a second pixel electrode arranged on the passivation layer, the second pixel electrode connected to the second drain electrode.

16. The display substrate of claim 12, wherein the passivation layer comprises:
an inorganic film arranged on the first source electrode, the first drain electrode, and the gate insulating layer; and
an organic film arranged on the inorganic film.

17. The display substrate of claim 12, wherein a lateral profile of each of the semiconductor pattern, the first source electrode, and the first drain electrode are connected with each other.

* * * * *